(12) United States Patent
Nishimura et al.

(10) Patent No.: US 7,493,744 B2
(45) Date of Patent: Feb. 24, 2009

(54) MEDICINE WRAPPING MACHINE, MEDICINE WRAPPING SHEET, AND DIVIDED WRAPPING BAG

(75) Inventors: Yasutoshi Nishimura, Gifu (JP); Kouichi Kobayashi, Gunma (JP)

(73) Assignees: Sanyo Electric Co., Ltd., Osaka (JP); Sanyo Electric Biomedical Co., Ltd., Gifu (JP)

( * ) Notice: Subject to any disclaimer, the term of this patent is extended or adjusted under 35 U.S.C. 154(b) by 29 days.

(21) Appl. No.: 10/735,181

(22) Filed: Dec. 12, 2003

(65) Prior Publication Data

US 2004/0124115 A1  Jul. 1, 2004

(30) Foreign Application Priority Data

Dec. 13, 2002  (JP)  ............................. 2002-362128

(51) Int. Cl.
B65B 43/02  (2006.01)
B65D 83/04  (2006.01)

(52) U.S. Cl. ........................... 53/562; 53/206; 206/530; 206/539

(58) Field of Classification Search ................ 206/528, 206/530, 534, 534.1, 534.2, 538, 539, 484, 206/484.2; 428/34.7, 35.2; 53/133.8, 912, 53/412, 206, 207, 208, 562, 574, 133.1; 493/186, 493/189, 194, 199, 930, 963; 156/252
See application file for complete search history.

(56) References Cited

U.S. PATENT DOCUMENTS

| | | | | |
|---|---|---|---|---|
| 2,008,659 | A * | 7/1935 | Salfisberg | 206/539 |
| 2,012,405 | A * | 8/1935 | Salfisberg | 206/232 |
| 2,851,212 | A * | 9/1958 | Parmer | 383/200 |
| 3,409,721 | A * | 11/1968 | Applezweig | 206/538 |
| 3,809,220 | A * | 5/1974 | Arcudi | 206/484 |
| 5,038,547 | A * | 8/1991 | Kai et al. | 53/412 |
| 5,908,113 | A * | 6/1999 | Takemasa et al. | 206/530 |
| 6,066,404 | A * | 5/2000 | Suzuura et al. | 428/35.7 |
| 6,199,698 | B1 * | 3/2001 | Hetrick et al. | 206/532 |
| 6,309,104 | B1 * | 10/2001 | Koch et al. | 206/484 |
| 6,568,533 | B1 * | 5/2003 | Tanaka et al. | 206/484 |
| 2002/0029984 | A1 * | 3/2002 | Hughes | 206/210 |

FOREIGN PATENT DOCUMENTS

| | | | |
|---|---|---|---|
| DE | 4324771 A1 * | 8/1994 | |
| JP | 05-18256 | 9/1987 | |
| JP | 03-27930 | 2/1991 | |
| JP | 05-049646 | 6/1993 | |
| JP | 2000-185703 | 12/1998 | |
| JP | 2001-183178 | 6/2001 | |

* cited by examiner

Primary Examiner—Luan K Bui
(74) Attorney, Agent, or Firm—Darby & Darby P.C.

(57) ABSTRACT

An object of the present invention is to provide a medicine wrapping machine which wraps each administered amount of a medicine in a medicine wrapping sheet, and enables easy opening even by an aged person or a child. The medicine wrapping machine uses a belt-shaped medicine wrapping sheet, and forms a plurality of divided wrapping bags continuous in a state of containing medicines therein and separated at the time of taking the medicines to wrap the medicines. A raw material of the medicine wrapping sheet is a belt-shaped transparent composite plastic sheet which includes a polyethylene terephthalate (PET) sheet or a biaxially oriented polypropylene sheet, and a minute flaw is formed on the polyethylene terephthalate sheet or the biaxially oriented polypropylene sheet.

10 Claims, 21 Drawing Sheets

MEDICINE WRAPPING MACHINE, MEDICINE WRAPPING SHEET, AND DIVIDED WRAPPING BAG

BACKGROUND OF THE INVENTION

The present invention relates to a medicine wrapping machine for wrapping each administered amount of a medicine prepared based on doctor's prescription in a medicine wrapping sheet at a hospital or a pharmacy, a medicine wrapping sheet and a divided wrapping bag used for the same.

Conventionally, in the case of administering a medicine prepared in accordance with a prescription to a patient, a medicine necessary for one administration has been divided and wrapped in the same divided wrapping bag by an automatic medicine wrapping machine or the like to be administered so that necessity of the patient to combine different medicines to take each time can be eliminated (e.g., see Japanese Patent Application Laid-Open No. 8 (1996)-11805).

As a material of the medicine wrapping bag, a wrapping sheet (glassine paper) which is easily handled by the automatic medicine wrapping machine, high in internal visibility to be easily prepared and monitored, high in openness (easy opening) of the dividing and wrapping sheet etc., and recently a wrapping sheet such as polyethylene laminate cellophane paper or polyethylene laminate glassine paper have generally been used.

However, since cellophane or the like is expensive, polypropylene, polyethylene terephthalate or the like which can be brought into contact with foods and whose safety has been verified has recently been used as a material of the medicine wrapping bag.

However, if the divided wrapping bag is manufactured by using polypropylene, polyethylene terephthalate or the like as a raw material, while handleability, and easy preparation and monitoring at the time of medicine dividing and wrapping are not inferior at all compared with the case of using conventional glassine paper, cellophane paper or the like, it is difficult for an aged person or a child to tell in what position and how the divided wrapping bag is opened when he opens the divided wrapping bag to take the medicine. Thus, there has been a problem in its handleability.

SUMMARY OF THE INVENTION

The present invention has been made to solve the foregoing conventional technical problems, and objects of the invention are to provide a medicine wrapping machine which wraps each administered amount of a medicine prepared based on doctor's prescription in a medicine wrapping sheet and enables easy opening even by an aged person or a child, a medicine wrapping sheet used for the medicine wrapping machine, and a divided wrapping bag made of the medicine wrapping sheet.

That is, a first aspect of the present invention is directed to a medicine wrapping machine for wrapping a medicine by using a belt-shaped medicine wrapping sheet and by forming a plurality of divided wrapping bags which are in a continuous state and which contain the medicine therein and which will be separated at the time of taking the medicine, wherein a raw material of the medicine wrapping sheet is a belt-shaped transparent composite plastic sheet which includes a polyethylene terephthalate sheet and a biaxially oriented polypropylene sheet; and a minute flaw is formed on the polyethylene terephthalate sheet or the biaxially oriented polypropylene sheet.

A second aspect of the present invention is directed to a medicine wrapping machine for wrapping a medicine by using a belt-shaped medicine wrapping sheet and by forming a plurality of divided wrapping bags which are in a continuous state and which contain the medicine therein and which will be separated at the time of taking the medicine, wherein a raw material of the medicine wrapping sheet is a belt-shaped transparent composite plastic sheet which includes a polyethylene terephthalate sheet and a biaxially oriented polypropylene sheet; and both side edge parts of the sheet are formed in wavy or saw-tooth shape to overlap each other when the sheet is folded in two, and the side edge parts are joined and thermally fused to each other.

A third aspect of the present invention is directed to the above medicine wrapping machine, wherein a minute flaw is formed on the polyethylene terephthalate sheet or the biaxially oriented polypropylene sheet of the medicine wrapping sheet.

A fourth aspect of the present invention is directed to the above medicine wrapping machine, wherein the side edge parts of the belt-shaped medicine wrapping sheet are joined and thermally fused to each other, and thermally fused in a belt shape of a predetermined width in an orthogonal direction to a longitudinal direction of the medicine wrapping sheet to form the divided wrapping bags which are in a continuous state and which contain the medicine therein and which will be separated at the time of taking the medicine.

According to the medicine wrapping machine of the present invention, the medicine wrapping sheet is not inferior at all compared with the case of using the conventional glassine or cellophane paper, e.g., in terms of handleability and easy preparation and monitoring during medicine dividing and wrapping, and it is cut to a desired predetermined width to be wound. Thus, the invention can be applied to the conventional automatic medicine wrapping machine. In other words, it is not necessary to manufacture or buy a new or dedicated automatic medicine wrapping machine.

Since even an aged person or a child can easily open the divided wrapping bag with bare hands, the divided and wrapped medicines can be guided not along the fused part but the folded part (nonfused part). Thus, it is possible to obtain highly effective operation effects, e.g., a capability of surely taking all of even fine particles such as powder medicines without leaving any, etc.

A fifth aspect of the present invention is directed to a belt-shaped medicine wrapping sheet for forming a plurality of divided wrapping bags which are in a continuous state and which contain the medicine therein and which will be separated at the time of taking the medicine, wherein a raw material of the medicine wrapping sheet is a plastic sheet; triangular notches are formed in both side edge parts of the medicine wrapping sheet to overlap each other when the sheet is folded in two; and both the side edge parts are joined and thermally fused to each other. Therefore, when the medicine contained in the divided wrapping bag is taken out, the divided wrapping bag can be cut and opened along the notch of the plastic sheet. Accordingly, for example, even a divided wrapping bag constituted of a plastic sheet difficult to be opened compared with a conventionally used wrapping sheet such as polyethylene laminate cellophane paper or polyethylene laminate glassine paper can be easily cut and opened from a desired notch position. Thus, the aged person, or the child, especially even a weakhanded sick person can easily be cut and opened the divided wrapping bag with bare hands.

A sixth aspect of the present invention is directed to the above medicine wrapping sheet, wherein the notches of both the side edge parts roughly match each other when the sheet is folded in two. Therefore, a cutting force is easily concentrated on the notch parts disposed on both side edge parts of the divided wrapping bag. Accordingly, the divided wrapping bag can be cut and opened from the notch part even by a relatively weak force. Thus, the aged person, or the child, especially even the weakhanded sick person can easily be cut and opened the plastic sheet from the notches of both side edge parts of the folded divided wrapping bag.

A seventh aspect of the present invention is directed to the above medicine wrapping sheet, wherein the notches of both the side edge parts deviate from each other when the sheet is folded in two. Therefore, when the divided wrapping bag is cut and opened from the notch parts disposed on both side edge parts of the medicine wrapping sheet, cut ends of the divided wrapping bag can deviate from each other. Accordingly, the divided wrapping bag can be easily opened from the cut and deviated ends of the divided wrapping bag. Thus, it is possible to take out the medicine from the divided wrapping bag very easily.

An eighth aspect of the present invention is directed to the above medicine wrapping sheet, wherein an angle formed between opposing oblique sides of the triangular notches is set to 110° or less. Therefore, in the medicine wrapping process by the medicine wrapping machine, tearing-off of the plastic sheet from the notch is difficult when the plastic sheet is pulled and, for example, it never happens that the angle of the triangular notch becomes excessively large to cause a difficulty of concentration of a force to be cut and opened the divided wrapping bag for the patient when the divided wrapping bag is opened. Thus, it is possible to provide a triangular shape notch which can be suitably used for wrapping the medicine by the medicine wrapping machine and which enables easy cutting-open of the divided wrapping bag by the patient.

A ninth aspect of the present invention is directed to the above medicine wrapping sheet, wherein a bottom part of each of the triangular notches is formed in a curved shape having a radius of 2 µm to 10 µm. Therefore, protrusion of a cut from its bottom is prevented when the notch is formed. Thus, it is possible to prevent inconveniences such as scattering of the medicine from the divided wrapping bag caused by tearing-off of the divided wrapping bag in an unintended direction.

A tenth aspect of the present invention is directed to a medicine wrapping machine for wrapping a medicine in which any belt-shaped medicine wrapping sheet described above is used, and a plurality of divided wrapping bags are formed which are in a continuous state and which contain the medicine therein and which will be separated at the time of taking the medicine. Therefore, at the stage of the plastic sheet, the notches can be formed on both side edge parts. Accordingly, notches can be easily formed in all the continuous divided wrapping bags. Thus, it is possible to remarkably reduce costs of the divided wrapping bags which contain the medicines.

An eleventh aspect of the present invention is directed to divided wrapping bags formed by joining and thermally fusing side edge parts of any belt-shaped medicine wrapping sheet described above to each other, and thermally fusing them in a belt shape of a predetermined width in an orthogonal direction to a longitudinal direction of the medicine wrapping sheet, wherein the divided wrapping bags are constituted so that they are in a continuous state, contain the medicine therein, and will be separated at the time of taking the medicine; and portions of the divided wrapping bags in which notches are formed are not thermally fused. Therefore, leakage of the raw material of the medicine wrapping sheet melted from the notch part of the triangular shape can be prevented. Thus, it is possible to prevent inconveniences such as sticking of the leaked raw material of the medicine wrapping sheet to the medicine wrapping machine or appearance deterioration of the divided wrapping bag.

A twelfth aspect of the present invention is directed to the divided wrapping bags, wherein a position which is joined and thermally fused is apart from a bottom part of each of the notches by 0.5 mm to 1.0 mm. Therefore, for example, leakage of the melted raw material of the medicine wrapping sheet to the notch end of the triangular shape can be effectively prevented. Accordingly, it is possible to prevent inconveniences such as sticking of the side edge part of the medicine wrapping sheet to the medicine wrapping machine. Thus, it is possible to prevent a reduction in operational performance of the medicine wrapping machine.

A thirteenth aspect of the present invention is directed to a medicine wrapping machine which forms the divided wrapping bags described above to wrap the medicines therein. Therefore, performance of the medicine wrapping machine can be remarkably improved. Thus, it is possible to remarkably increase convenience of the medicine wrapping machine.

DETAILED DESCRIPTION OF THE PREFERRED EMBODIMENTS

Figure 1A:
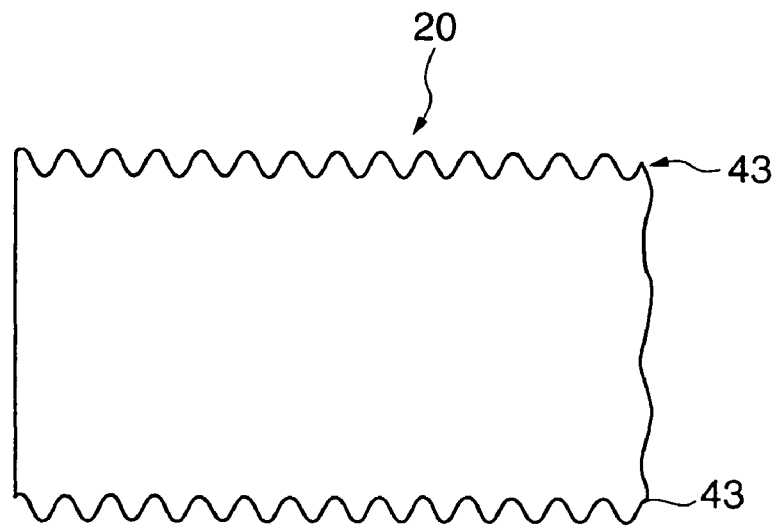
FIG. 1A is a partial plan view schematically showing a medicine wrapping sheet according to an embodiment of the present invention.
Figure 1B:
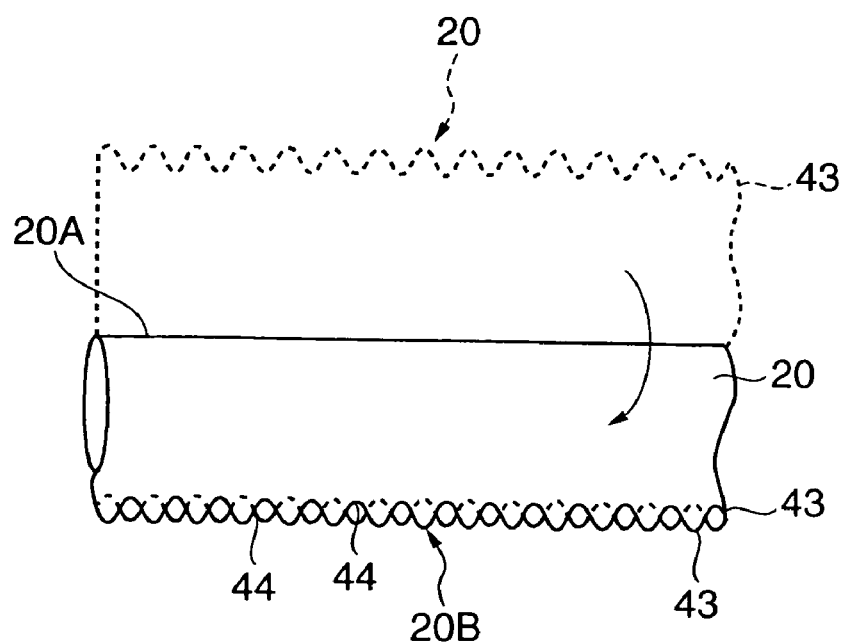
FIG. 1B is a partial plane view schematically showing a state in which the medicine wrapping sheet of FIG. 1A is folded in two.

Next, the embodiments of the present invention will be described in detail with reference to the accompanying drawings. FIG. 1A is a partial plan view schematically showing a medicine wrapping sheet 20 of an embodiment of the present invention. FIG. 1B is a partial plan view schematically showing a state in which the medicine wrapping sheet 20 of FIG. 1A is folded in two. The specific embodiments of the present invention are described. However, these are only representative examples, and thus various design changes can be made.

Figure 2A:
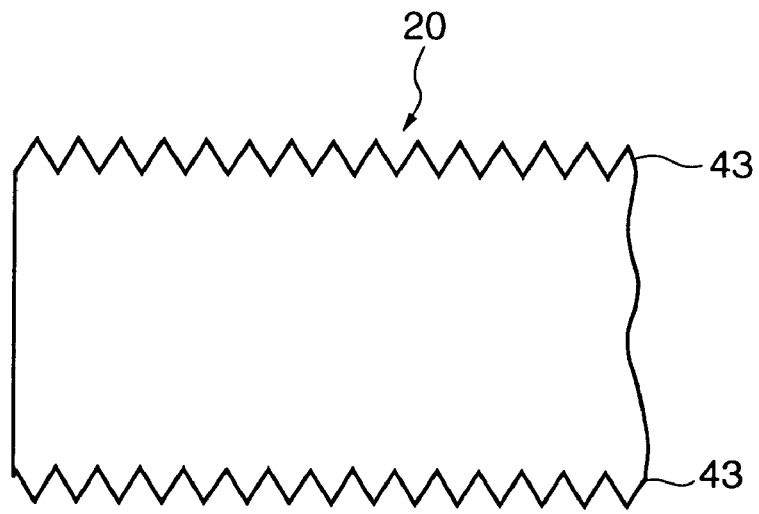
FIG. 2A is a partial plan view schematically showing a medicine wrapping sheet according to another embodiment of the present invention.
Figure 2B:
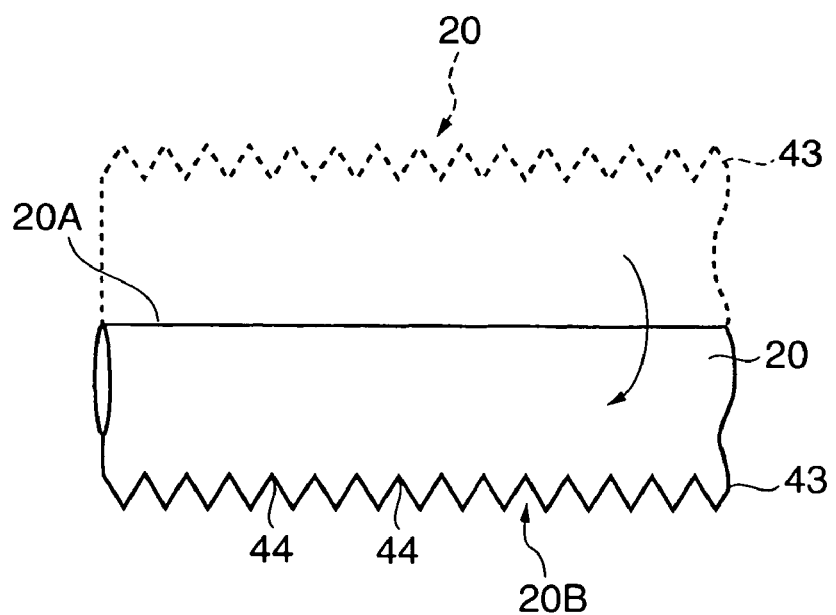
FIG. 2B is a partial plane view schematically showing a state in which the medicine wrapping sheet of FIG. 2A is folded in two.

A raw material of the medicine wrapping sheet 20 is constituted of a belt-shaped transparent composite plastic sheet 42 formed by bonding and laminating a low-density polyethylene sheet 41 of a thickness 10 μm to 50 μm, preferably 15 μm to 40 μm, on a backside of a polyethylene terephthalate (PET) sheet 40 (FIG. 3) of a thickness 10 μm to 100 μm, preferably 10 μm to 50 μm, more preferably 12 μm to 40 μm. (1) On both side edge parts 43, 43 of the medicine wrapping sheet 20, notches 44 are formed in a wavy shape having a pitch width of 0.5 mm to 10 mm, preferably about 0.5 mm to 4 mm (FIGS. 1A, 1B). On both side edge parts 43, 43 of the medicine wrapping sheet 20, notches 44 may be formed in a triangular shape (saw-tooth shape) having a pitch width of 0.5 mm to 10 mm, preferably about 0.5 mm to 4 mm (FIGS. 2A, 2B).

(2) For both side edge parts 43, 43 of the medicine wrapping sheet 20, a roller having numerous fine diamond particles may be pressed to the PET sheet 40 to form numerous minute flaws (not shown) on a full surface. Further, (3) numerous minute flaws (not shown) may be formed on the full surface of the PET sheet 40, and notches 44 of the wavy or triangular shape may be formed on both side edge parts 43, 43. However, the PET sheet 40 can be replaced by a biaxially oriented polypropylene sheet.

Figure 3:
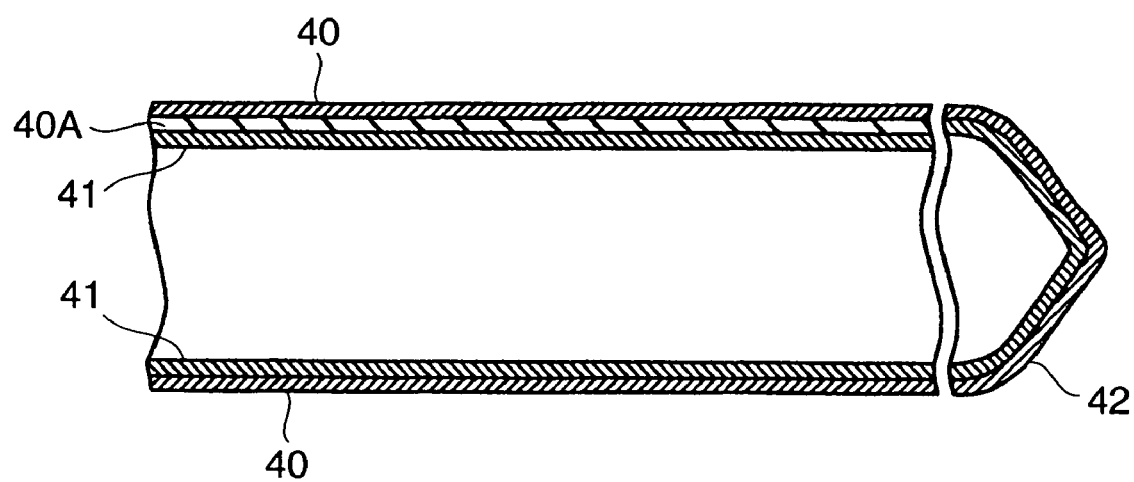
FIG. 3 is a partial sectional view schematically showing a medicine wrapping sheet according to another embodiment of the present invention.
Figure 4:
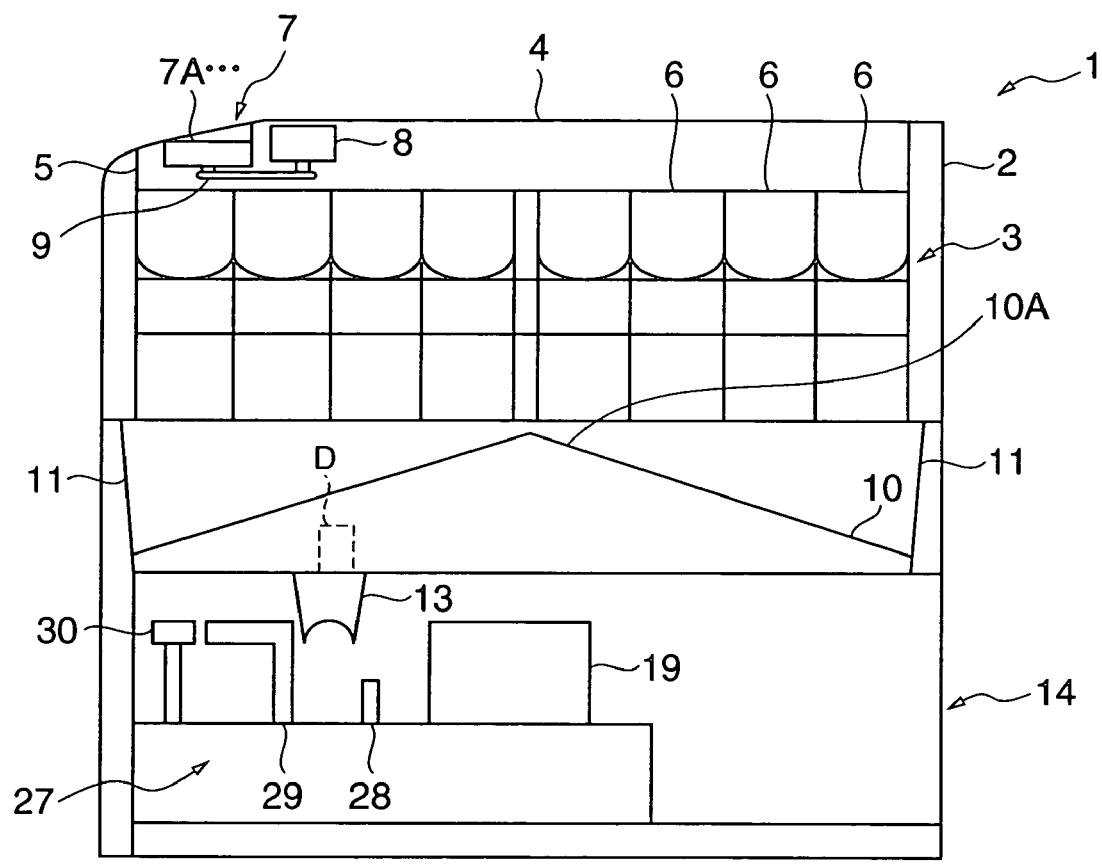
FIG. 4 is a vertical sectional side view of a medicine wrapping machine of the present invention.

The constitution in which the low-density polyethylene sheet 41 is bonded and laminated on a printing surface 40A of the PET sheet 40 on which a pattern, a character or the like has been printed is preferable because erasure of the pattern, the character or the like is difficult, and a good appearance thereof can be maintained for a long time (FIG. 3).

A constitution can be employed in which the low-density polyethylene sheet 41 is bonded and laminated on a deposition surface of the PET sheet 40 on which silica or aluminum has been deposited. Additionally, a printable white display surface may be formed by coating on a half of the transparent composite plastic sheet 42 in a longitudinal direction of the PET sheet 40 side.

A transparent composite plastic sheet 42 formed by bonding and laminating another plastic sheet such as a polypropylene sheet to be brought into contact with foods in place of the low-density polyethylene sheet 41 may be used.

The transparent composite plastic sheet 42 of (1) to (3) can be easily manufactured, for example, by continuously cutting the wide plastic sheet to a desired predetermined width by using a roller which has a triangular (saw-tooth shaped) blade to wind it.

In the case of the medicine wrapping sheet 20 constituted in the aforementioned manner, since the PET sheet 40 is superposed on one surface of the low-density polyethylene sheet 41, when it is folded in two at the center so that the low-density polyethylene sheet 41 side can become an inner surface side, both ends can be exactly superposed on each other, and then three sides are joined and thermally fused to each other to enable formation of serial sections. In other words, it can be used as a medicine wrapping sheet 20 of a divided wrapping bag 36 which continuously divides and wraps prepared medicines by the automatic medicine wrapping machine 1 of a thermal fusing type (described later).

Figure 5:
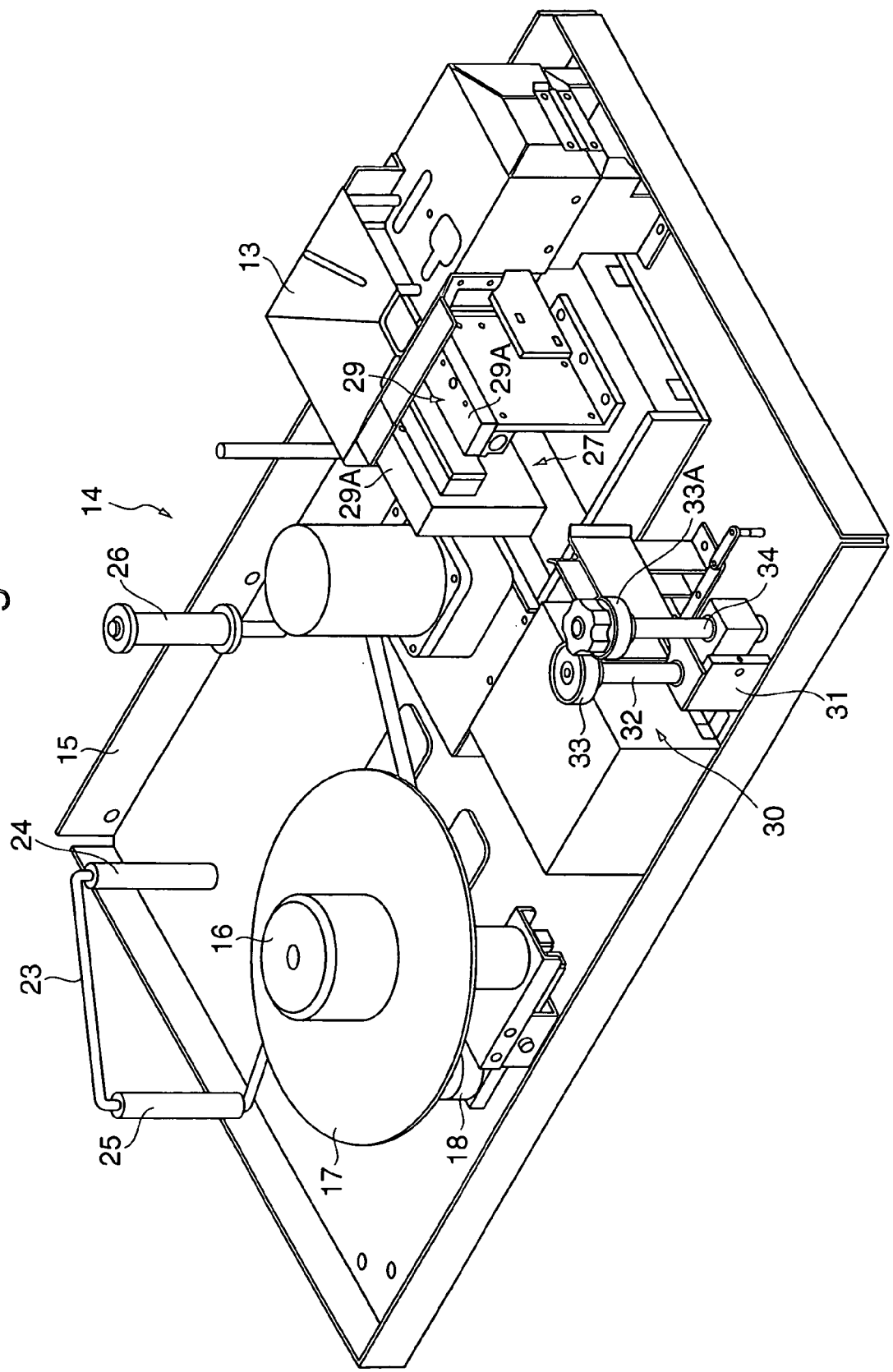
FIG. 5 is a perspective view of a solid medicine wrapping mechanism of the medicine wrapping machine of the present invention excluding a medicine wrapping sheet roll.

Now, description will be made of the medicine wrapping machine 1 which puts and wraps a solid medicine as a medicine in the medicine wrapping sheet 20 by referring to FIG. 5. The medicine wrapping machine 1 is installed at a hospital, a dispensing pharmacy or the like, and it comprises a medicine containing mechanism 3 disposed in a rectangular exterior case 2, a medicine wrapping mechanism 14 disposed therebelow, etc. A tablet case receiving section 5 of the medicine containing mechanism 3 is formed in an upper part in the exterior case 2. An upper opening of this tablet case receiving section 5 is closed by a top table 4 so as to be freely opened.

A plurality of tablet cases 6 . . . are received in the tablet case receiving section 5, and a sub-receiving section 7 is installed on a front upper part thereof. The sub-receiving section 7 receives a medicine (e.g., a tablet cut into half) which cannot be contained in the tablet case 6, and a belt conveyor (not shown, it may be connected by a chain, a gear or the like in this case) is driven by a belt 9 set on a rotary shaft pulley (not shown) of a motor 8. A plurality of receiving sections 7A are continuously disposed on the belt conveyor.

A discharge counting device such as a photosensor (not shown) is disposed below each of the tablet cases 6 . . . . This discharge counting device is communicated with each tablet case 6 above, and a motor-driven discharge drum is incorporated therein. The discharge drum is structured in a manner that solid medicines such as tablets, capsules, pills or lozenges enter a plurality of grooves formed on a side face in a row up and down. Then, the medicines are dropped from each groove one by one by rotation of the discharge drum, and the number thereof is detected to be counted by the photosensor.

A drop passage is formed in one end of each sub-receiving section 7, and this drop passage is communicated with a turntable 10 (described later). Each medicine is received in the receiving section 7A of the sub-receiving section 7. A user carries out a switch operation to rotate the motor 8, whereby the medicines are dropped one by one from the receiving sections 7A through the drop passage to the turntable 10.

The disk turntable 10 is disposed below each tablet case 6 and the drop passage to collect the medicines. This turntable 10 has a corresponding area below all the tablet cases 6 and the drop passage. A raised part 10A which is conically swelled is formed on a center of the turntable 10. The turntable 10 is rotary-driven at a predetermined speed by a turntable motor (not shown) disposed below the raised part 10A.

An annular guide 11 is erected around the turntable 10, and an outlet D is notched in a proper position of the guide 11. A chuter 13 (described later) is disposed below the outlet D. The medicines collected on the guide 11 side by the rotation of the turntable 10 are dropped into the chuter 13. The chuter 13 has a reverse-square conical shape, an upper opening corresponds to the outlet D of the turntable 10, and an opened lower end (tip) corresponds to an upper side between the folded medicine wrapping sheets 20.

Figure 6:
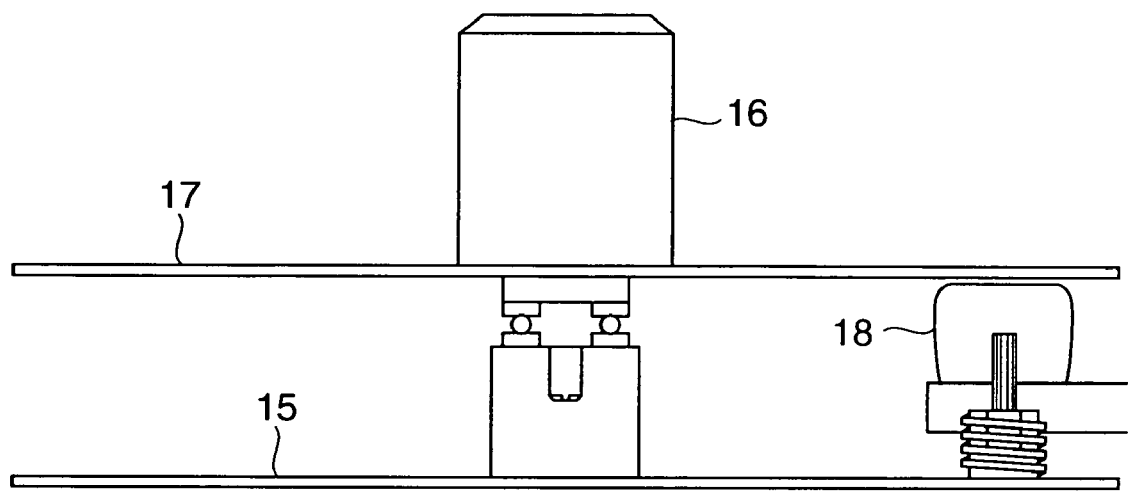
FIG. 6 is a side view around a rotary shaft of the solid medicine wrapping mechanism.

On the other hand, the medicine wrapping mechanism 14 is disposed below the turntable 10. The medicine wrapping mechanism 14 comprises mounting means for mounting a medicine wrapping roll 19 (described later), guiding means for guiding the pulled out medicine wrapping sheet 20 to a predetermined position, and pulling-in means for pulling a tip of the medicine wrapping sheet 20 which are arranged on a base 15 (FIG. 5). As shown in FIG. 6, the medicine wrapping sheet mounting means comprises a rotary shaft 16 rotatably erected on the base 15, a disk mounting plate 17 positioned on a bottom part of the rotary shaft 16 to be extended outside, and a solenoid-driven brake 18 arranged below the mounting plate 17 (between the plate and the base 15).

Figure 7:
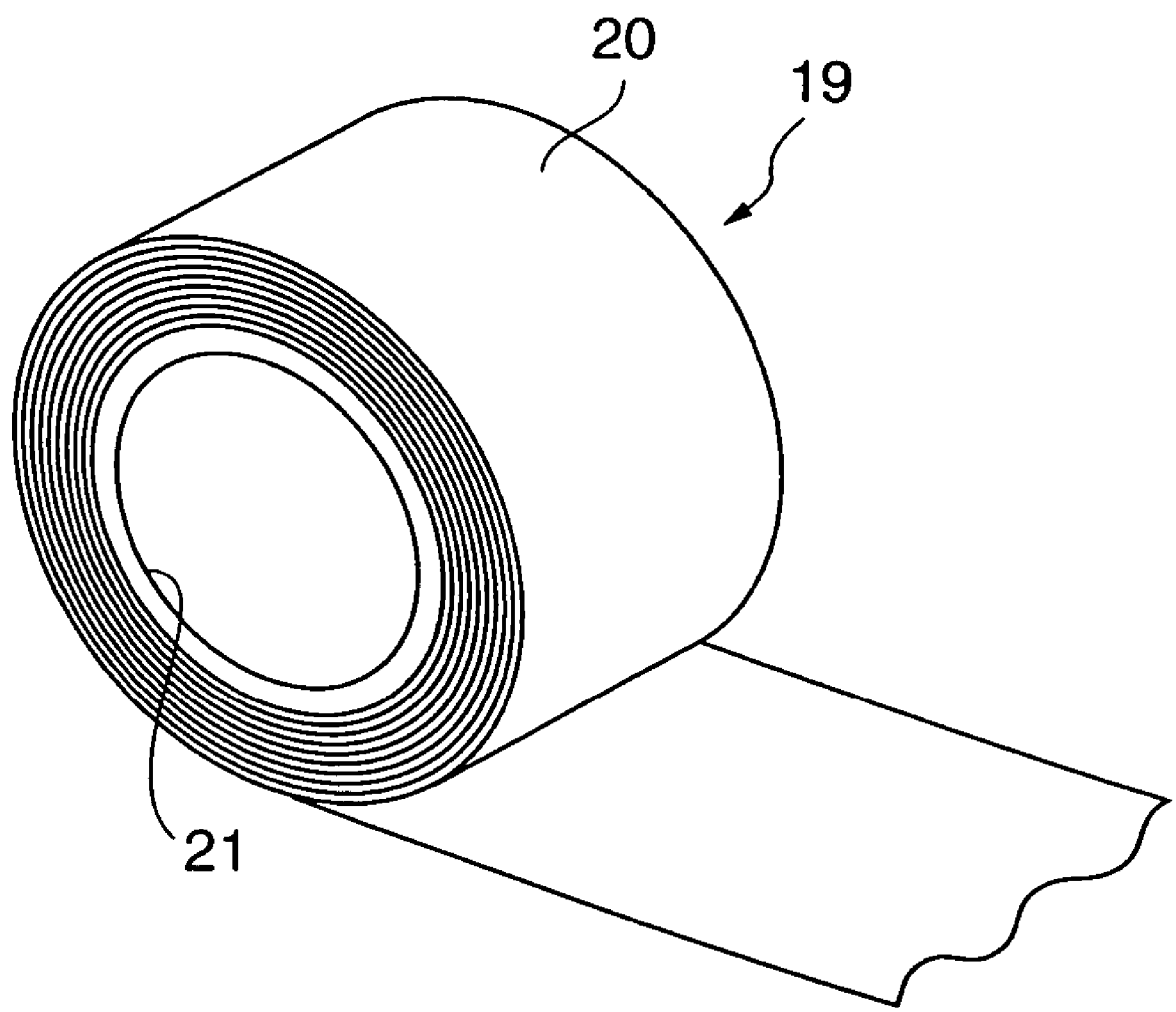
FIG. 7 is a perspective view of a medicine wrapping sheet roll.
Figure 8:
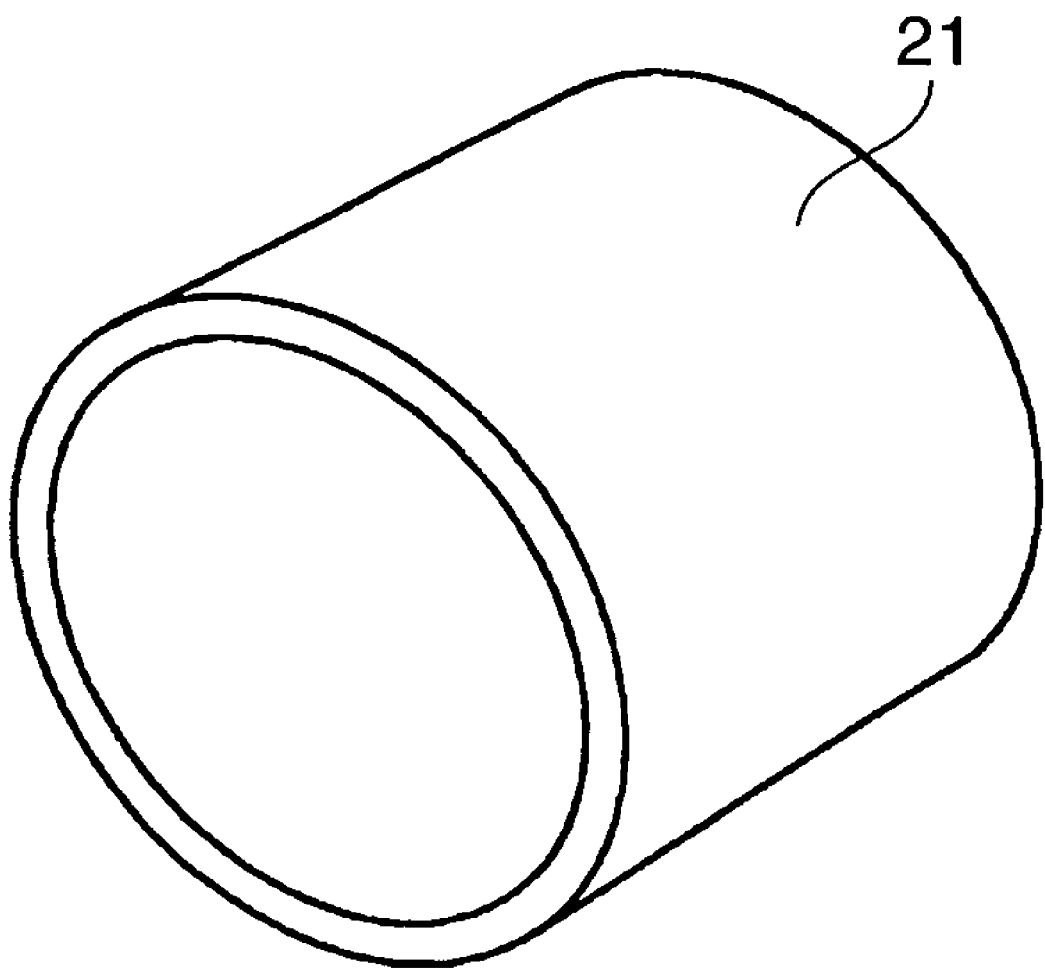
FIG. 8 is a perspective view of a shaft material which constitutes the medicine wrapping sheet roll of FIG. 7.

The rotary shaft 16 exhibits a cylindrical shape which has an outer diameter roughly matching (slightly smaller) an inner diameter of a shaft material 21 of the medicine wrapping sheet roll 19 (described later). The rotary shaft 16 is detachably inserted into the shaft material 21 formed in the medicine wrapping sheet roll 19. The medicine wrapping sheet roll 19 comprises a hollow tubular shaft material (normally called a paper tube) 21 made of a hard synthetic resin (may be made of thick paper), and the medicine wrapping sheet 20 wound around the same (FIGS. 7, 8). The medicine wrapping sheet 20 is disposed by winding an oblong belt-shaped sheet of a predetermined width in a roll shape around the shaft material 21.

Figure 9:
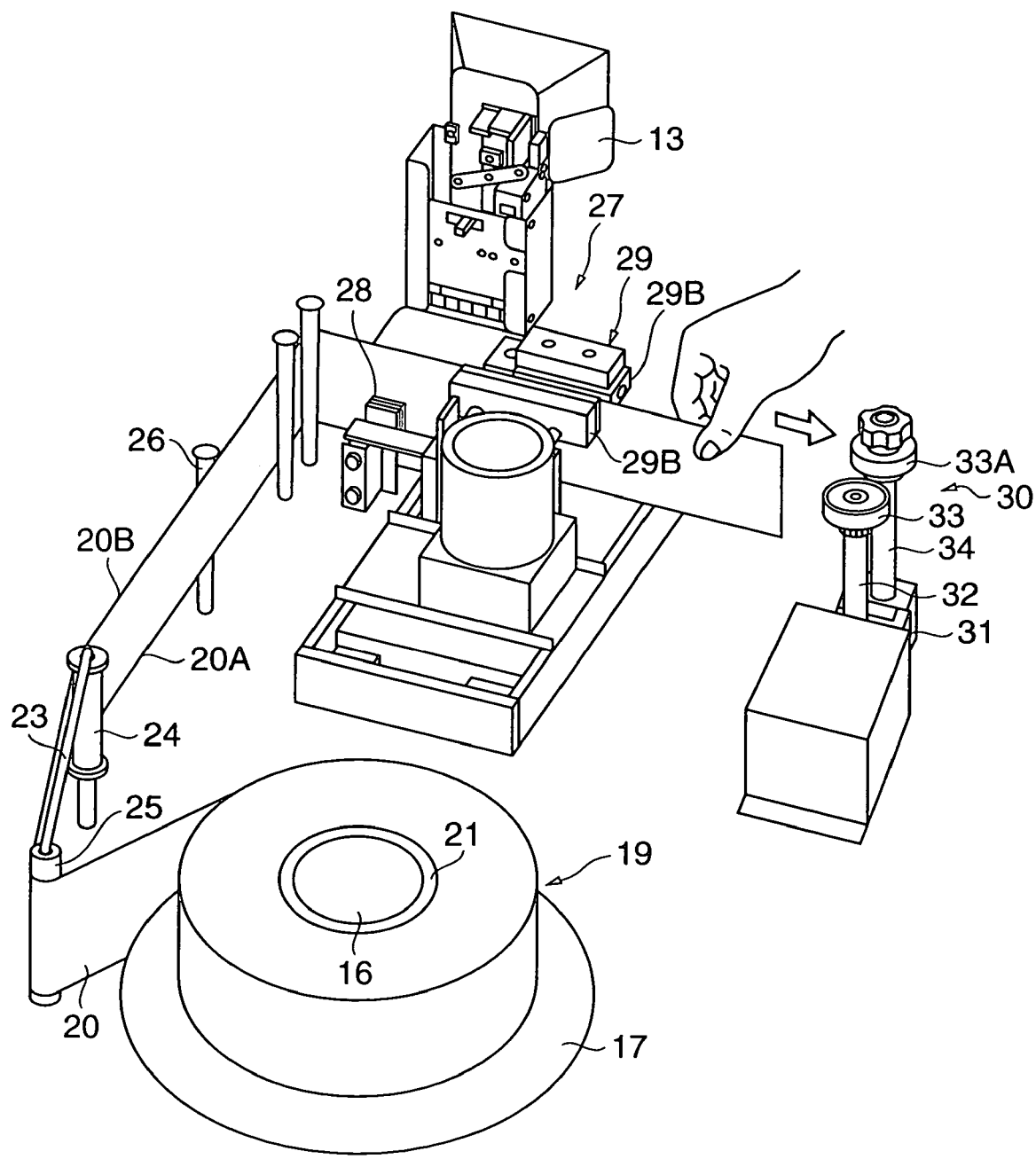
FIG. 9 is a perspective view of the solid medicine wrapping mechanism in a middle state of mounting the medicine wrapping sheet roll.

The medicine wrapping sheet 20 is folded in two at the rough center in a width direction as described above. A part folded in two is set as a folded part 20A, and both ends (sides opposite the folded part 20A) of the folded part are set as openings 20B. In the folded state, the medicine wrapping sheet 20 is wound around the shaft material 21 while the folded part 20A is on a lower end edge side of the shaft material 21, and a tail end of the wound medicine wrapping sheet 20 is pulled out (FIG. 9).

In the medicine wrapping mechanism 14, a tension lever 23 is positioned as guiding means on the side of the rotary shaft 16, and the tension lever 23 is hung between two rollers 24, 25. In this case, the roller 24 is fixed to the base 15, while the roller 25 is freely swung around the roller 24. The roller 25 is pressed by a spring member (not shown) in a direction apart from the rotary shaft 16. A position of the roller 25 is detected by a switch (not shown). A reference numeral 26 denotes a guide roller erected on the base 15 on the side of the roller 24.

A pulling-in roller 30 is disposed as pulling-in means on the base 15 opposite the tension lever 23 sandwiching the rotary shaft 16. The pulling-in roller 30 comprises a pair of narrow rubber rollers (rollers made of natural rubber, synthetic rubber or the like) 33, 33A which are rotatably attached to upper ends of rotary shafts 32, 34. The rotary shaft 32 to which one rubber roller 33 is attached is a rotary shaft of a pulling-in motor 31.

The rotary shaft 34 of the other rubber roller 33A is pressed by a coil spring or the like (not shown). One rubber roller 33A is pressed into contact with the rubber roller 33 by a predetermined pressure, and the pulling-in motor 31 is rotated to rotate both rubber rollers 33, 33A. By holding the medicine wrapping sheet 20 (opening 20B side) between both rubber rollers 33, 33A, the medicine wrapping sheet 20 is pulled out from the medicine wrapping sheet roll 19.

Figure 10:
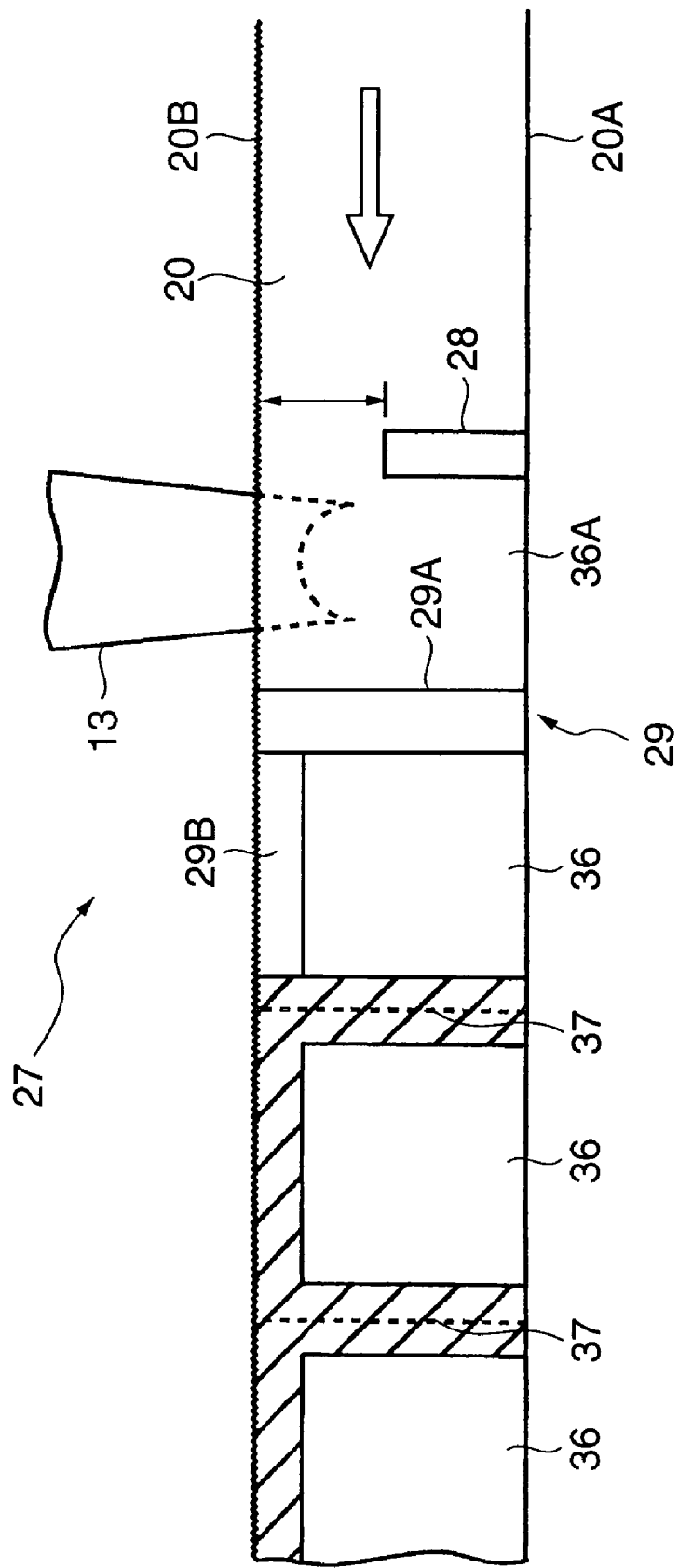
FIG. 10 is a side view of a heat seal mechanism.

A heat seal mechanism 27 is disposed between the guide roller 26 and the pulling-in roller 30 (FIG. 10). The heat seal mechanism 27 seals the openings 20B of the medicine wrapping sheet 20 by joining and thermal-fusing, and partitions the sheet for each dose. It comprises a pair of temporary heaters 28, 28 oppositely disposed at a predetermined interval, and a pair of main heaters 29, 29. Actuators (not shown) are disposed in one of the temporary heaters 28, and one of the main heaters 29, and adapted to be freely pressed into contact with/moved apart from the opposing temporary heater 28 and the opposing main heater 29. The temporary and main heaters 28 and 29 are energized to be heated to predetermined temperatures.

The main heaters 29, 29 comprise vertical parts 29A, 29A, and parallel parts 29B, 29B. The parallel part 29B has a width roughly equal to that of the temporary heater 28, and the vertical part 29A has a width twice as large as that of the parallel part 29B. The medicine wrapping sheet 20 is held from both sides to be heated by the temporary heater 28, whereby the medicine wrapping sheet 20 is thermally fused from the folded part 20A side to the rough center of the openings 20B (solid line arrow range of FIG. 10 is not thermally fused to be fixed).

The vertical part 29A of the main heater 29 is adapted to hold the part heated by the temporary heater 28 to be thermally fused from both sides to thermally fuse and fix the medicine wrapping sheet 20 from the folded part 20A side to the openings 20B, and to form a small bag 36A having an opening 20B on one side on the temporary heater 28 side. The parallel part 29B is adapted to thermally fuse the opening 20B opposite the temporary heater 28 (in this case, a size from the main heater 29 to the temporary heater 28).

After the thermal-fusing of the medicine wrapping sheet 20 by the heat seal mechanism 27, rotation of the pulling-in roller 30 causes a movement by a predetermined distance to its side (white arrow direction of FIG. 10), i.e., the part thermally fused by the temporary heater 28 is moved to the main heater 29 (to the heat-fused part of the main heater 29 from the folded part 20A to the opening part 20B). Then, the medicine wrapping sheet 20 is thermally fused by the main heater 29 to form each small bag 36A having an opening 20B between the temporary heater 28 and the vertical part 29A of the main heater 29, and to form a divided wrapping bag 36 thermally fused except the folded part 20A on the pulling-in roller 30 side.

When the medicine wrapping sheet 20 on the temporary heater 28 is thermally fused from the folded part 20A to the opening 20B by the main heater 29, a cut in which a plurality of perforations 37 (perforated holes) are disposed is formed on the rough center of the width of the heat-fused part (from the folded part 20A to the opening 20B). Accordingly, three sides (remaining one is the folded part 20A) of the medicine wrapping sheet 20 are thermally fused to form a divided wrapping bag 36 whose circumference is closed, and the divided wrapping bag 36 can be separated by being cut off from the perforations 37.

Next, description will be made of an operational process and an operation of the medicine wrapping machine 1 of the present invention constituted in the foregoing manner. First, the rotary shaft 16 is inserted into the shaft material 21 of the medicine wrapping sheet roll 19 to mount the medicine wrapping sheet roll 19 on the mounting plate 17. At this time, the rotary shaft 16 is inserted in a state in which the folded part 20A is positioned on the mounting plate 17 side. The medicine wrapping sheet roll 19 is wound around the shaft material 21 by folding the medicine wrapping sheet 20 in two as described above, and it comprises the folded part 20A and the opening 20B. Thus, if the medicine wrapping sheet roll 19 is mounted upside down, the folded part 20A and the opening 20B are reversed, and consequently medicine wrapping cannot be carried out by the medicine wrapping mechanism 14.

After the mounting of the medicine wrapping sheet roll 19 to the rotary shaft 16, the tip of the medicine wrapping sheet 20 of the medicine wrapping sheet roll 19 is pulled out, sequentially passed through the outsides of the rollers 25, 24 of the tension lever 23, passed through the inside of the guide roller 26, and then extended between the temporary heater 28 and the main heater 29 (chuter 13 has fallen down) to the pulling-in roller 30 (FIG. 9).

Then, the tip of the medicine wrapping sheet 20 is inserted between both rubber rollers 33, 33A of the pulling-in roller 30 and, when the pulling-in motor 31 is driven, the rubber rollers 33, 33A are pressed into contact with each other to pull the medicine wrapping sheet 20 form the heat seal mechanism 27 side downward to an opposite side (near side). Thus, the medicine wrapping sheet 20 is pulled in by the pulling-in roller 30 to be pulled out to the near side.

In this case, the roller 25 of the tension lever 23 is moved toward the rotary shaft 16 when tension of the medicine wrapping sheet 20 becomes strong, and moved in a direction apart from the rotary shaft 16 when the tension becomes weak. Then, the movement of the roller 25 is detected by the switch as described above and, when it is moved apart from the rotary shaft 16, the solenoid is driven by a controller (not shown) to press the brake 18 to the mounting plate 17. When the roller 25 is moved toward the rotary shaft 16, the brake 18 is moved apart. Thus, always proper tension is applied to the medicine wrapping sheet 20 pulled out from the medicine wrapping sheet roll 19.

When the medicine wrapping machine 1 in which the medicine wrapping sheet roll 19 is mounted to the rotary shaft 16 and the medicine wrapping sheet 20 is pulled out to be mounted is started, a count value or the like indicating the number of dropped medicines is reset. It is assumed that the temporary heater 28 and the main heater 29 are heated to predetermined temperatures, and the turntable 10 is energized to be always rotated. Then, when an operator writes prescription data in an input device (not shown, personal computer or the like) based on doctor's prescription, the discharge drum of the tablet cases 6 which contain the medicines is rotary-driven, and medicines of kinds specified by the prescription data are dropped one by one to the turntable 10. Additionally, medicines from the sub-receiving section 7 are similarly dropped to the turntable 10 by user's optional operation.

The number of medicines dropped from the tablet cases 6 is counted by the controller (not shown) based on an output of the photosensor. If the counted number of the dropped medicines coincides with the number of medicines based on the prescription data, the rotation of the discharge drum is stopped to finish the dropping of the medicines. The medicines (including medicines from the sub-receiving section 7) dropped on the turntable 10 are moved toward the outside guide 11 by a centrifugal force of the rotated turntable 10 to be collected, and then dropped into the chuter 13 below the outlet D disposed in the guide 11. Thus, the medicines are put through the chuter 13 into the small bag 36A of the medicine wrapping sheet 20 positioned below.

After the medicines have been received in the small bag 36A of the medicine wrapping sheet 20, the controller pulls the medicine wrapping sheet 20 by the pulling-in roller 30, and the medicine wrapping sheet 20 is joined and thermally fused by the heat seal mechanism 27 as described above to be sealed.

A shutter (not shown) which enters the small bag 36A to expand the opening 20B is attached to a lower end of the chuter 13. At this time, the temporary heater 28 of the heat seal mechanism 27 thermally fuses the medicine wrapping sheet 20 from the folded part 20A side to the rough center between the openings 20B but does not fuse its upper side. Thus, the medicine wrapping sheet 20 can be pulled in by the pulling-in roller 30 (arrow direction in FIG. 9) without raising the shutter of the chuter 13.

Then, when the movement of the medicine wrapping sheet 20 is stopped, thermal-fusing of the medicine wrapping sheet 20 is carried out again by the main heater 29. The medicines are wrapped in the divided wrapping bag 36, and simultaneously received from the turntable 10 through the chuter 13 in the small bag 36A. By repeating this operation, a predetermined number of medicines of kinds based on the prescription data is automatically wrapped. FIG. 10 shows that a vertical fused part 38 and a horizontal fused part 39 (described later) are thermally fused by the temporary heater 28 and the main heater 29. Actually, however, both side positions apart by a predetermined size from the perforation 37 part are thermally fused, and the parallel part 29B of the main heater 29 heat-fuses the horizontal fused part 39 (including a wavy or saw-tooth shape part) formed on the opening 28B side of the divided wrapping bag 36.

Figure 11:
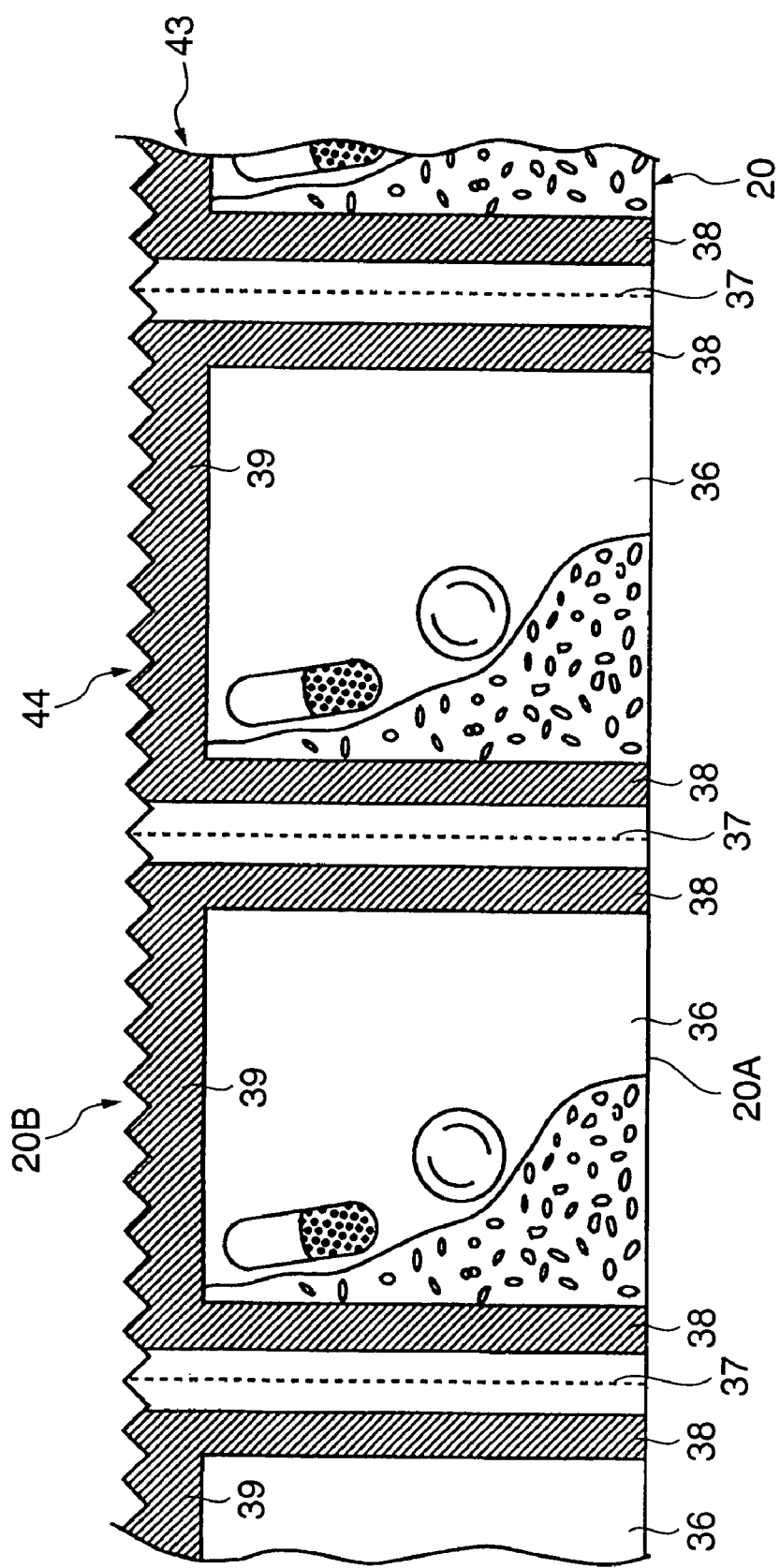
FIG. 11 is a plan view schematically showing a medicine wrapping sheet according to an embodiment of the present invention.

As shown in FIG. 11, the heat-fused part of the medicine wrapping sheet 20 sections the divided wrapping bag 36 at roughly equal intervals, and comprises the vertical fused part 38 for sealing the belt-shaped medicine wrapping sheet 20 in a longitudinal direction and an orthogonal direction, and the horizontal fused part 39 which is generally continuous from the vertical fused part 38 and which seals a joined surface of the belt-shaped medicine wrapping sheet 20 in a direction identical to the longitudinal direction. That is, the aforementioned medicine wrapping sheet 20 is folded in two at the folded part 20A, the vertical fused part 38 and the horizontal fused part 39 are joined and thermally fused to each other by the medicine wrapping machine 1, and a perforation 37 is formed in the vertical fused part 38 by a sawing-machine blade. Accordingly, one divided wrapping bag 36 can be easily cut off from another.

In the case of using the medicine wrapping sheet 20 in which a notch 44 is formed in a wavy or saw-tooth shape, when the medicine wrapping sheet 20 is folded in two at the folded part 20A, both side edge parts 43, 43 of wavy or saw-tooth shape are exactly joined together to constitute the notch 44. Additionally, if both side edge parts 43, 43 of the medicine wrapping sheet 20 are formed in wavy or saw-tooth shape of small pitch widths of 0.5 mm to 2 mm, the horizontal fused part 39 can be thermally fused even if both side edge parts are not joined exactly together when the medicine wrapping sheet 20 is folded in two (see FIG. 1B). This is preferable because the notch 44 can be formed on the opening 20B side of the divided wrapping bag 36.

By using the medicine wrapping sheet 20 of the foregoing (2) in which numerous minute flaws (not shown) are formed on the PET sheet 40 side, and that of the (3) in which numerous minute flaws are formed on the full surface of the PET sheet 40, and both side edge parts 43, 43 constitute the notch 44 formed in the wavy or saw-tooth shape, prepared medicines can be continuously divided and wrapped by the automatic medicine wrapping machine 1 of the thermal fusing type as in the previous case.

If these medicine wrapping sheets 20 are used, since the numerous flaws are formed on the full surface of the PET sheet 40, the divided wrapping bag 36 which contains the medicines can be easily cut and opened by pulling it from an optional position of the horizontal fused part 39 in a direction orthogonal to the horizontal fused part 39.

According to the divided wrapping bag 36 of the present invention, since the divided and wrapped medicines can be guided not along the heat-fused part but along the heat non-fused part (folded part 20A), it is possible to surely take fine particles such as powder medicines without leaving any.

In the divided wrapping bag 36 which contains the medicines, the medicine wrapping sheet 20 is folded in two, and the horizontal fused part 39 is joined and thermally fused by the medicine wrapping machine 1. However, if the horizontal fused part 39 (including the wavy or saw-tooth shape part) is joined and thermally fused by the medicine wrapping machine 1, the medicine wrapping sheet raw material melted on the end of the triangular notch 44 of the medicine wrapping sheet 20 may be leaked to adhere to the parallel part 29B of the main heater 29. If the raw material leaked through the end of the triangular notch 44 adheres to the parallel part 29B, the side edge part 43 of the medicine wrapping sheet 20 is stuck to the parallel part 29B to disable pulling-in of the medicine wrapping sheet 20 by the pulling-in roller 30, consequently causing a problem in the medicine wrapping machine 1.

Figure 12:
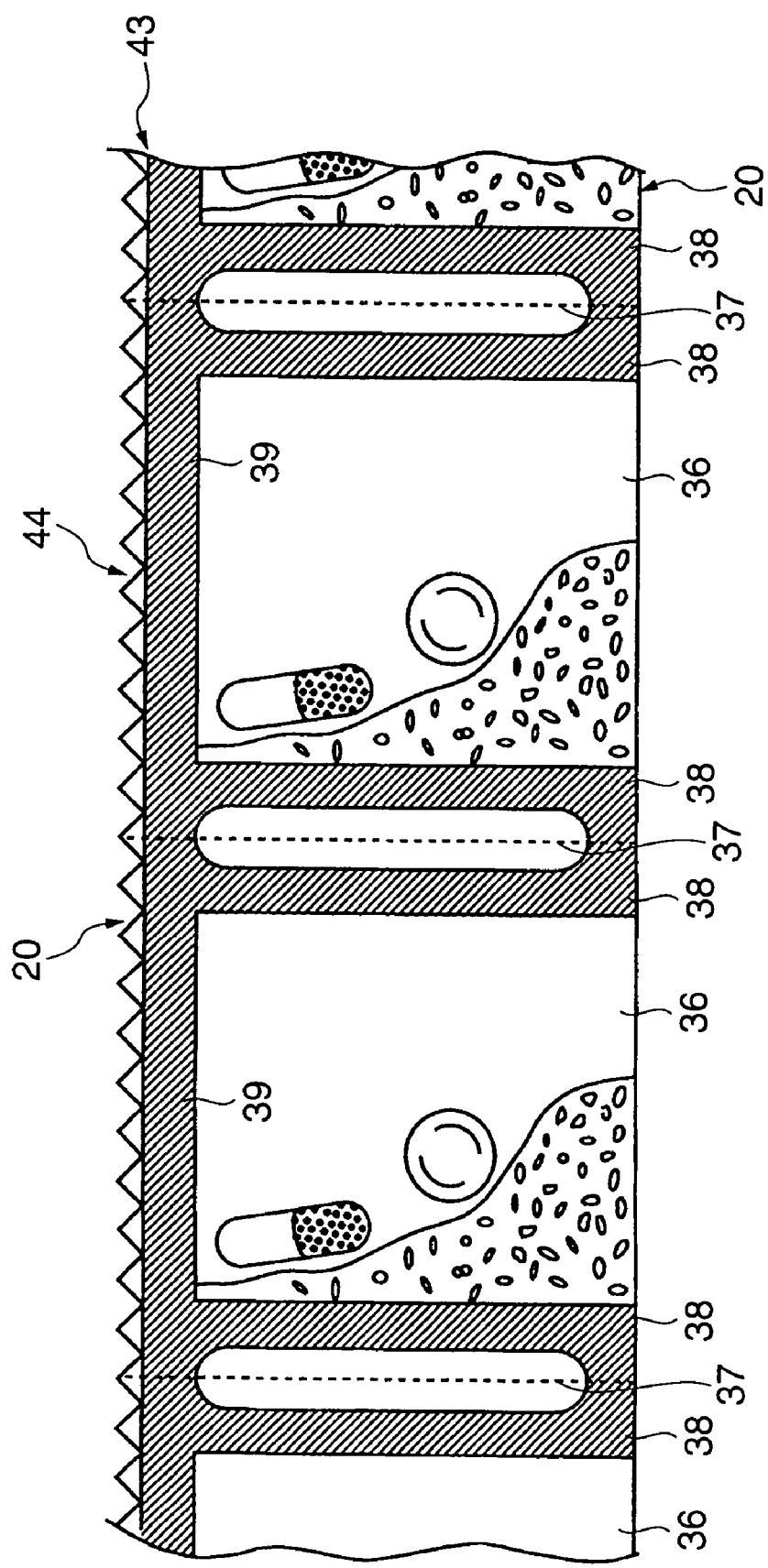
FIG. 12 is a plan view schematically showing a medicine wrapping sheet according to another embodiment of the present invention.

FIG. 12 shows a divided wrapping bag 36 which can prevent leakage of the medicine wrapping sheet raw material melted on the end of the triangular notch 44. In this case, as in the previous case, a medicine wrapping sheet 20 is formed in a belt shape in which a plurality of divided wrapping bags 36 are formed to be continuous while medicines are contained inside, and to be separated when the medicines are taken. A raw material of the medicine wrapping sheet 20 is a transparent composite plastic sheet 42 as in the previous case. Triangular notches 44, 44 having the saw-tooth shape roughly similar to those of the previous case are formed in both side edge parts 43, 43 of the medicine wrapping sheet 20 (transparent composite plastic sheet 42).

Figure 13:
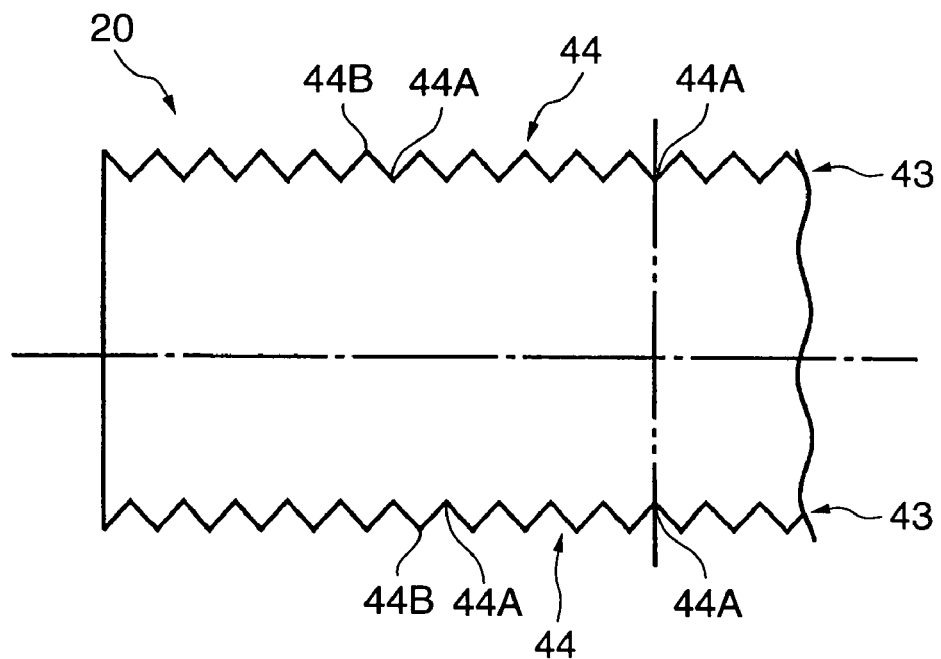
FIG. 13 is a partial plan view schematically showing the medicine wrapping sheet of FIG. 12.
Figure 14:
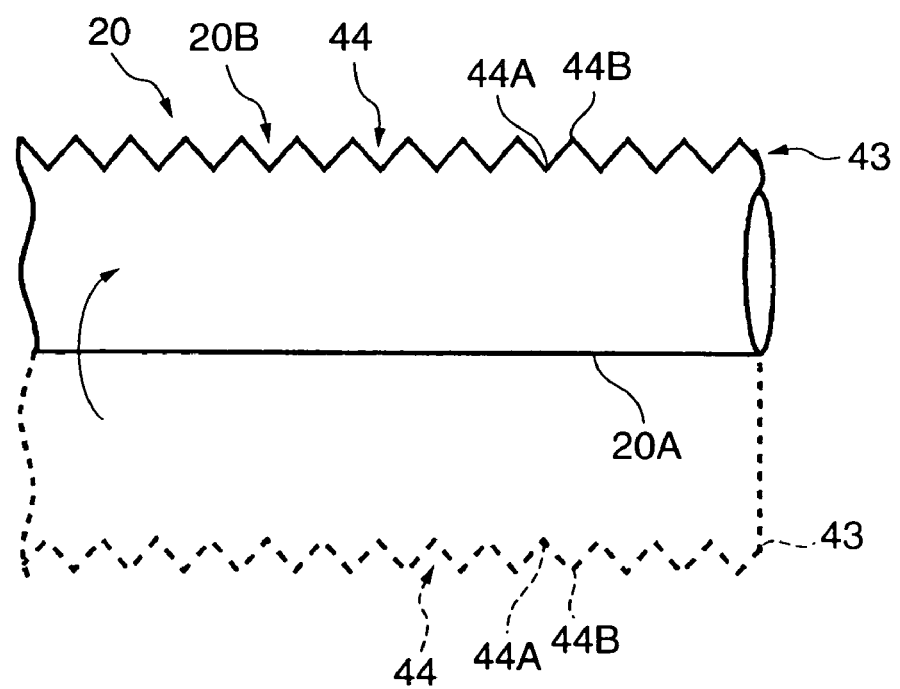
FIG. 14 is a partial plan view schematically showing a state in which the medicine wrapping sheet of FIG. 13 is folded in two.

The notch 44 is formed in a triangular shape comprising a bottom part 44A in which a tip of an oblique side is positioned toward a folded part 20A, and a peak part 44B in which the tip of the oblique side is positioned apart from the folded part 20A. In a state in which the medicine wrapping sheet 20 is folded in two at the folded part 20A, a bottom part 44A of a triangular notch 44 disposed on one side of the medicine wrapping sheet 20 and a bottom part 44A of a triangular notch 44 disposed on the other side are superposed on each other (2-dotted chain line of FIG. 13). In this case, needless to say, a peak part 44B of the triangular notch 44 disposed on one side of the medicine wrapping sheet 20 and a peak part 44B of the triangular notch 44 formed on the other side are superposed on each other. That is, both side edge parts 43, 43 of the medicine wrapping sheet 20 are constituted in such a manner that when the medicine wrapping sheet 20 is folded in two at the folded part 20A, both sides (both notches 44, 44) having the triangular shape can be superposed to roughly match each other (FIG. 14).

Figure 15:
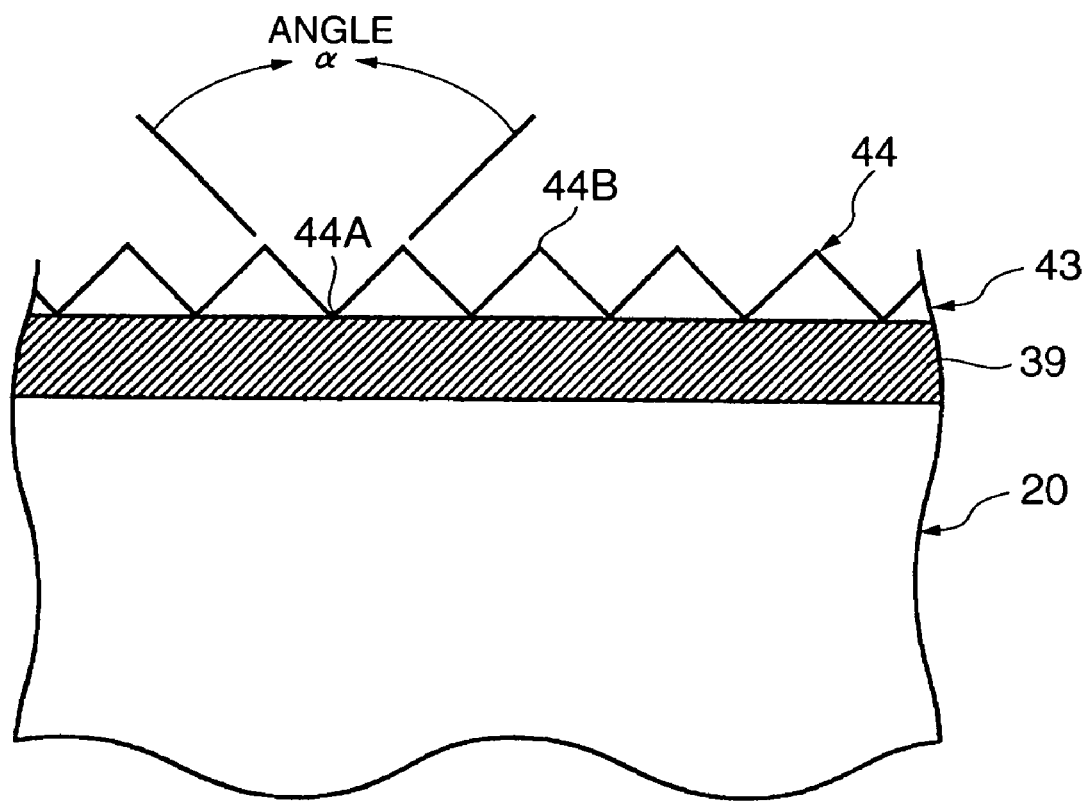
FIG. 15 is an expanded view of a side edge part (notch) of the medicine wrapping sheet of FIG. 12.

The notch 44 is formed by setting an angle $\alpha$ of the bottom part 44A, i.e., an angel $\alpha$ formed between opposing oblique sides of the triangular notch 44, to 110° or less (in this case, between 110° to 100°). A horizontal fused part 39 is disposed on the side edge part 43, and both horizontal fused parts 39 are joined and thermally fused roughly in contact with the bottom part 44A of the notch 4 (FIG. 15). Other components are similar to the foregoing. Heat fusing of a vertical fused part 38 is not carried out at a center part of a perforation 37. Both ends of the perforation 37 are thermally fused to a predetermined width (roughly width size of the vertical fused part 38 in this case), and the vertical fused part 38 of the adjacent divided wrapping bag 36 is continuously thermally fused (FIG. 12).

Accordingly, when the medicines contained in the divided wrapping bag 36 are taken out, the divided wrapping bag 36 can be cut and opened along the notch 44 of the medicine wrapping sheet 20 (transparent composite plastic sheet 42). Thus, for example, even the diving and wrapping bag 36 constituted of the transparent composite plastic sheet 42 difficult to be cut and opened compared with the conventionally used wrapping sheet such as polyethylene laminate cellophane paper or polyethylene laminate glassine paper can be easily cut and opened from the notch 44 part of a desired position.

In this case, since the part in which the notch 44 is formed is not thermally fused, it is possible to prevent leakage of the raw material of the medicine wrapping sheet melted on the end of the triangular notch 44. Thus, the bottom part 44A of the triangular notch 44 can prevent a problem caused in the wrapping mechanism by the leaked raw material, and losses of easy cutting-open of the divided wrapping bag and a good appearance.

When the medicine wrapping sheet 20 is folded in two at the folded part 20A, the notches 44 of both side edge parts 43, 43 roughly match each other. Thus, cutting-in forces are easily concentrated on the notches 44 (bottom parts 44A of the triangular shape) disposed on both side edge parts of the divided wrapping bag 36. When the cutting-in forces are concentrated on the notches 44 of both side edge parts 43, 43, the divided wrapping bag 36 can be cut and opened from the notch 44 part even by a relatively weak force. Thus, even an aged person, a child, especially even a weakhanded sick person can easily be cut and opened the folded medicine wrapping sheet 20 (transparent composite plastic sheet 42) from the notches 44 of both side edge parts 43, 43 of the divided and wrapping bag 36.

Since the angle $\alpha$ formed between the opposing oblique sides of the triangular notch 44 is set to 110° or less, in the medicine wrapping process by the medicine wrapping machine 1, tearing-off of the transparent composite plastic sheet 42 becomes difficult even when the medicine wrapping sheet 20 (transparent composite plastic sheet 42) is pulled. Moreover, when the divided wrapping bag 36 is cut and opened, for example, it never happens that the angle $\alpha$ of the notch 44 becomes excessively large to cause a difficulty of concentration of a force to be cut and opened the divided wrapping bag 36 for the patient. Thus, it is possible to provide the divided wrapping bag 36 which can be suitably used for medicine wrapping by the medicine wrapping machine 1, and which can be easily cut and opened by the patient.

Figure 16:
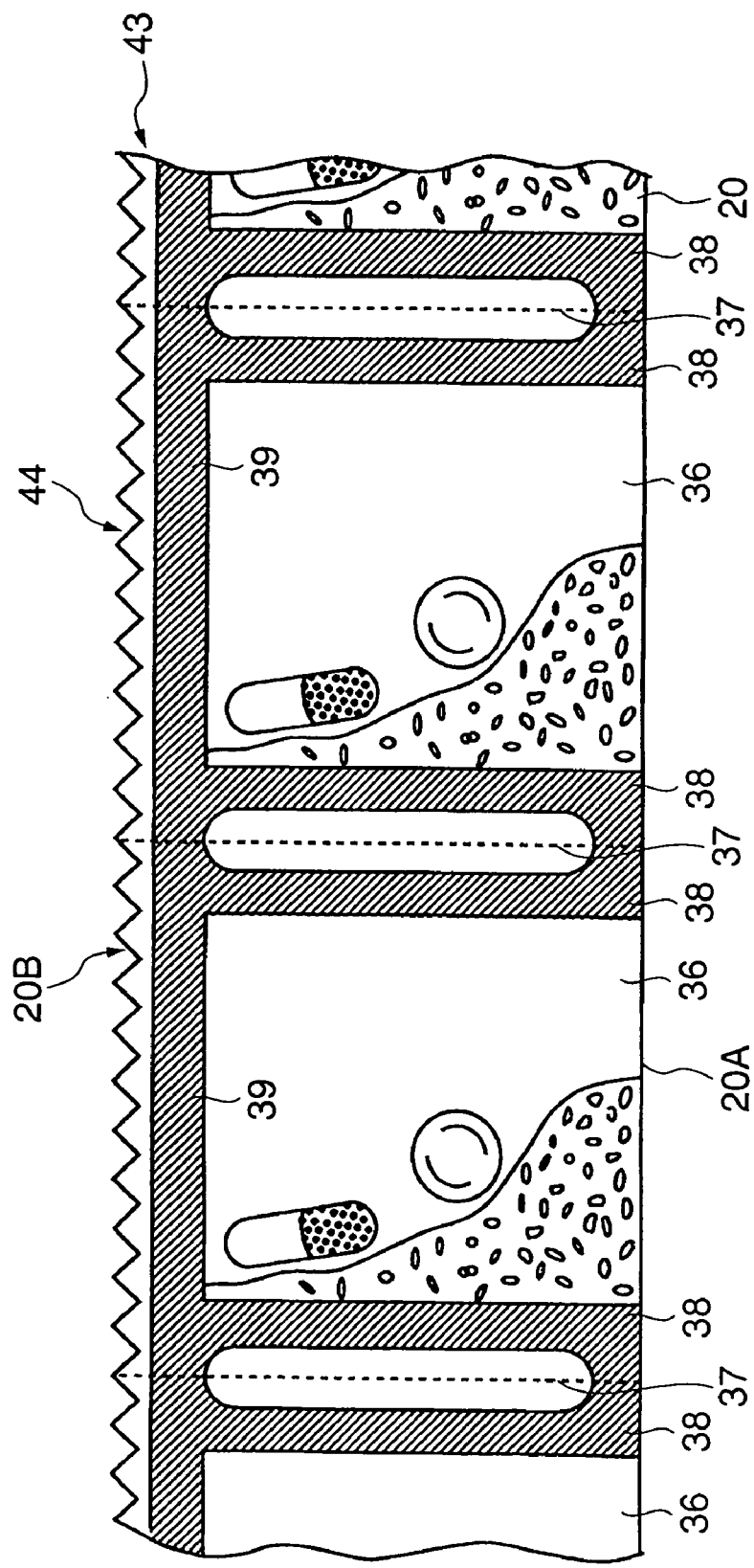
FIG. 16 is a plan view schematically showing a medicine wrapping sheet according to yet another embodiment of the present invention.
Figure 17:
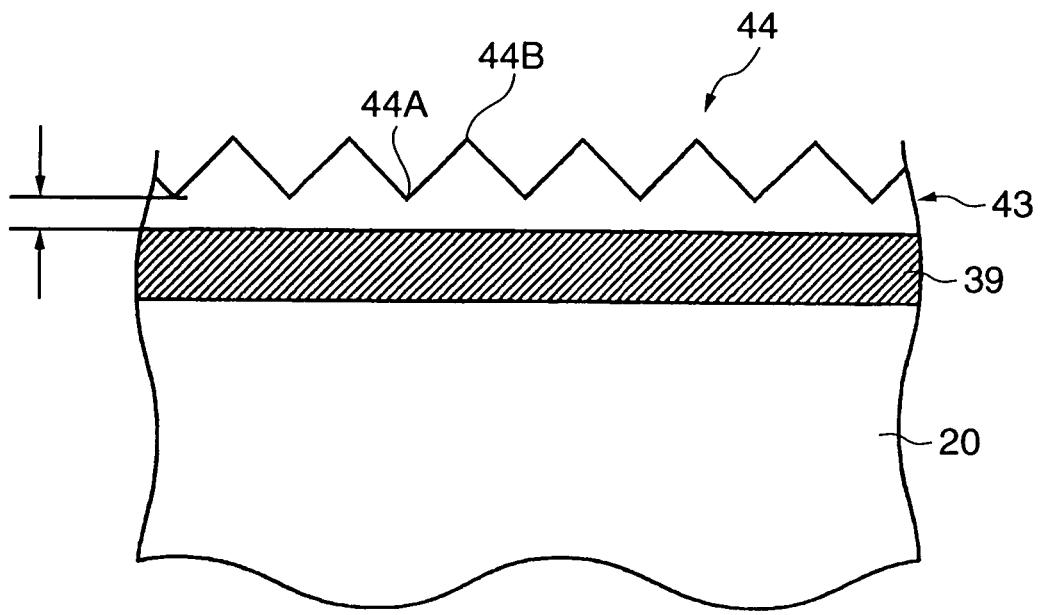
FIG. 17 is an expanded view of a side edge part (notch) of the medicine wrapping sheet of FIG. 16.

Next, FIG. 16 shows a divided wrapping bag 36 according to yet another embodiment of the present invention. In this case, a notch of 44 of the divided wrapping bag 36 and a horizontal fused part 39 are set apart from each other by a predetermined size, and the horizontal fusing parts 39 are joined and thermally fused. That is, a thermally fused position (horizontal fused part 39) is set apart from a bottom part 44A of the notch 44 by 0.5 mm to 1.0 mm (in an arrow range of FIG. 17). Accordingly, when the horizontal fusing parts 39 are joined and thermally fused, a leaked sealant is retained between the horizontal fused part 39 and the notch 44 to be prevented from flowing to the end of the notch 44. Thus, it is possible to more effectively prevent leakage of a raw material of the medicine wrapping sheet melted on the end of the triangular notch 44, and to prevent a loss of easy cutting-open of the bottom part 44A of the triangular notch 44 by the leaked raw material.

Especially, since the notch 44 of the divided wrapping bag 36 and the horizontal fused part 39 are set apart from each other by the predetermined size, when the patient cuts open the divided wrapping bag 36, its cutting-open force can be concentrated on the bottom part 44A of the triangular notch 44 of the divided wrapping bag 36. Thus, even an aged person or a child, especially even a weakhanded sick person can easily be cut and opened the divided wrapping bag 36.

Figure 18:
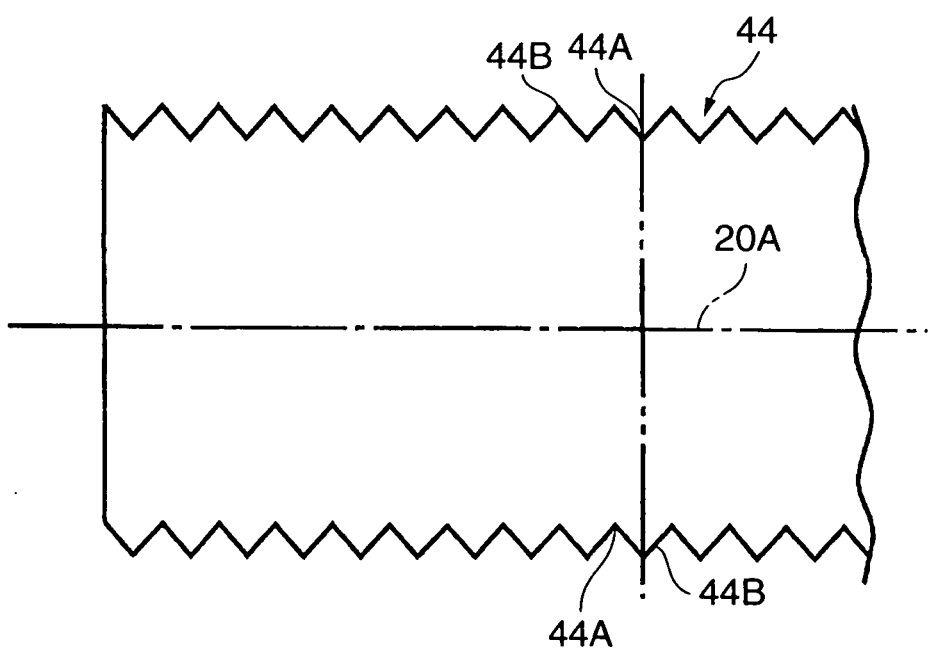
FIG. 18 is a partial plan view schematically showing the medicine wrapping sheet of FIG. 16.
Figure 19:
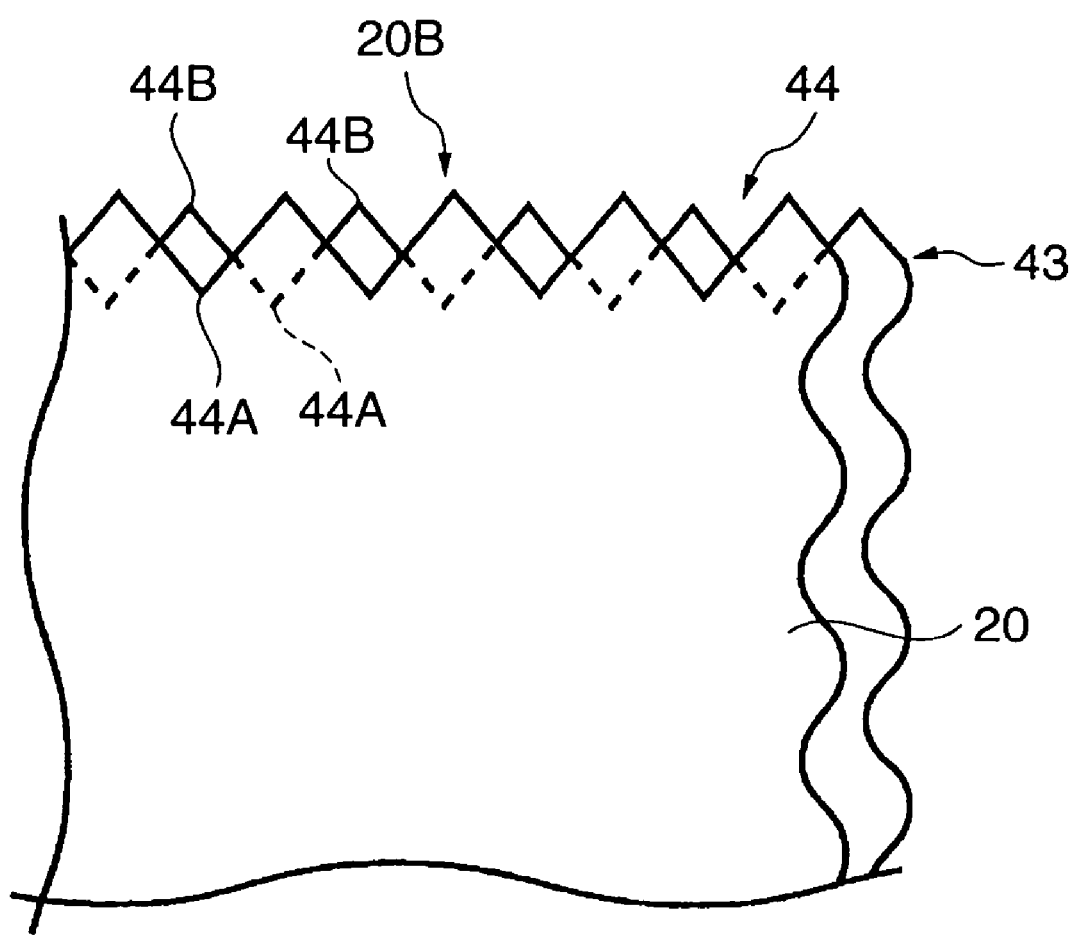
FIG. 19 is a partial plan view schematically showing a state in which the medicine wrapping sheet of FIG. 16 is folded in two.

FIG. 18 shows another divided wrapping bag 36 of the present invention. As in the previous case, each of notches 44 of both side edge parts 43, 43 of a medicine wrapping sheet 20 is formed in a triangular shape comprising a bottom part 44A in which a tip of an oblique side is positioned toward a folded part 20A, and a peak part 44B in which the tip of the oblique side is positioned apart from the folded part 20A. In a state in which the medicine wrapping sheet 20 is folded in two at the folded part 20A, a bottom part 44A of a triangular notch 44 disposed on one side of the medicine wrapping sheet 20 and a peak part 44B of a triangular notch 44 disposed on the other side are superposed on each other (2-dotted chain line of FIG. 18). In this case, needless to say, a peak part 44B of the triangular notch 44 disposed on one side of the medicine wrapping sheet 20 and a bottom part 44A of the triangular notch 44 formed on the other side are superposed on each other. That is, both side edge parts 43, 43 of the medicine wrapping sheet 20 are constituted in such a manner that when the medicine wrapping sheet 20 is folded in two at the folded part 20A, both the sides (bottom and peak parts 44A and 44B of both notches) having the triangular shape can deviate from each other (FIG. 19).

Thus, when the divided wrapping bag 36 is cut and opened from the notches 44 disposed in both side edge parts 43, 43 of the medicine wrapping sheet 20, cut ends of the dividing and wrapping sheet 36 can deviate from each other. Additionally, the divided wrapping bag 36 can be easily opened from the cut and deviated ends thereof. Thus, a user can take out medicines from the divided wrapping bag 36 very easily.

Figure 20:
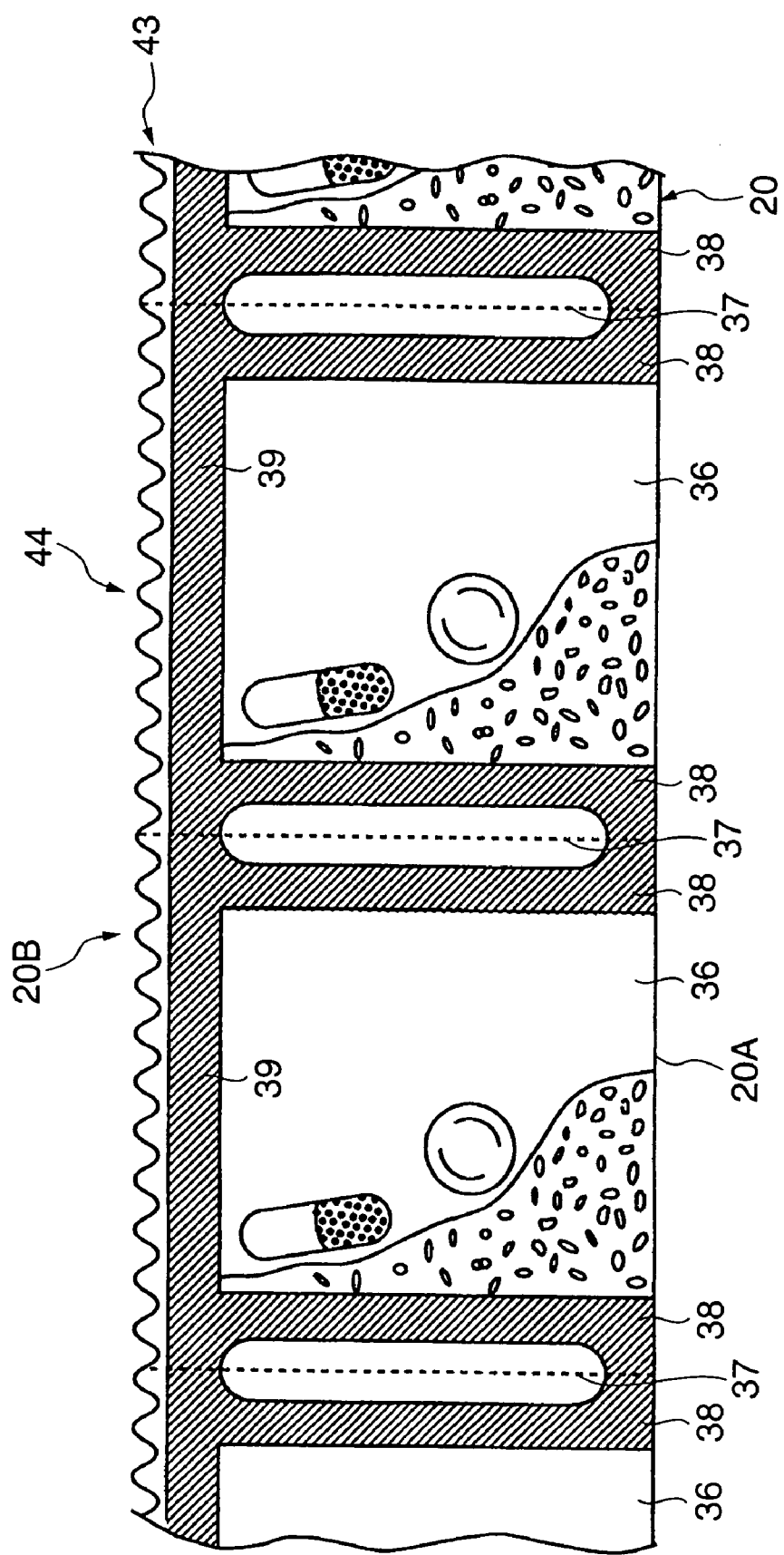
FIG. 20 is a plan view schematically showing a medicine wrapping sheet of yet another embodiment of the present invention.
Figure 21:
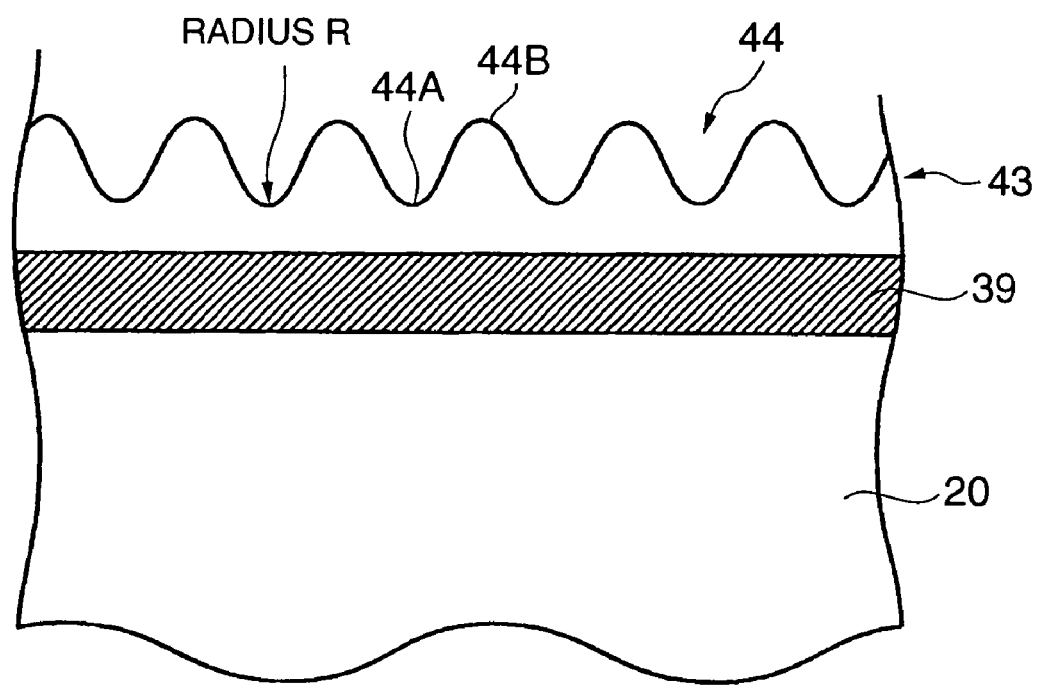
FIG. 21 is an expanded view of a side edge part (notch) of the medicine wrapping sheet of FIG. 20.

FIG. 20 shows another divided wrapping bag 36 of the present invention. In this case, bottom and peak parts 44A and 44B of triangular notches 44 of both side edge parts 43, 43 of a medicine wrapping sheet 20 are formed to be curved. Specifically, the bottom part 44A of each of the triangular notches 44 of both side edge parts 43, 43 of the medicine wrapping sheet 20 is formed in a curved shape in which a radius R is 2 μm to 10 μm (arrow in FIG. 21). In this case, a size of the curved shape of the bottom part 44A of the triangular notch 44 is set such that in a medicine wrapping process by the medicine wrapping machine 1, tearing-off of the medicine wrapping sheet 20 is difficult even when it is pulled, and the patient can easily be cut and opened the divided wrapping bag 36 when it is cut and opened from the notch 44. A joined and thermally fused position (horizontal fused part 39) and the bottom part 44A of the notch 44 are set apart from each other by a predetermined size (0.5 mm to 1.0 mm as in the previous case).

Figure 22:
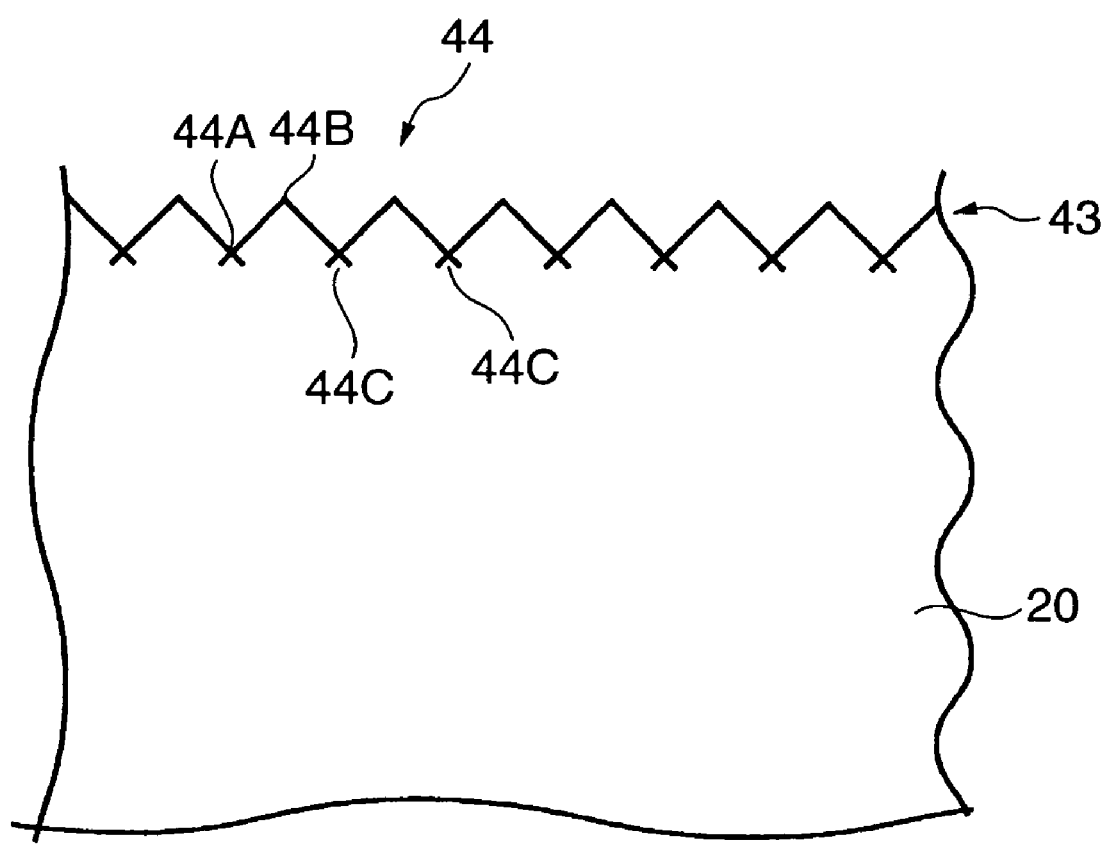
FIG. 22 is an expanded view of a side edge part of a medicine wrapping sheet in which a triangular notch is disposed for comparison with FIG. 21.

If oblique sides are continuously cut by a blade (not shown) to dispose triangular notches 44 in both side edge parts 43, 43 of the medicine wrapping sheet 20, a triangular shape cannot be formed unless a tip of each oblique side is cut slightly before (opposite direction of a peak part) the bottom part 44A. That is, if the triangular notch 44 on the bottom part 44A of which no curved shape is formed is continuously cut, an extended cut part 44C bulged and extended from the bottom part 44A is inevitably formed on the triangular bottom part 44A (FIG. 22).

If the extended cut part 44C is formed on the triangular bottom part 44A, when the divided wrapping bag 36 is cut and opened, the divided wrapping bag 36 may be torn off in an unintended direction to cause inconveniences such as scattering of medicines from the divided wrapping bag 36. Thus, according to the embodiment of FIGS. 20, 21, the bottom parts 44A of the triangular notches 44 of both side edge parts 43, 43 of the medicine wrapping sheet 20 are formed in a curved shape to prevent inconvenience of scattering of medicines from the divided wrapping bag 36 caused by its tearing-off in an unintended direction.

If the bottom part 44A of the notch 44 of the medicine wrapping sheet 20 is formed in a predetermined curved shape based on the aforementioned size, tearing-off of the medicine wrapping sheet 20 becomes difficult in the medicine wrapping process by the medicine wrapping machine 1 and, when the patient cuts open the divided wrapping bag 36, its cutting-open force can be concentrated on the bottom part 44A of the triangular notch 44 of the divided wrapping bag 36. Accordingly, as cutting-open of the divided wrapping bag 36 along the direction of the notch 44 is facilitated, it is possible to prevent inconveniences such as scattering of medicines from the divided wrapping bag 36 caused by its tearing-off in an unintended direction. In the drawing, the peak part 44B of the triangular notch 44 is also in the curved shape. However, there is no problem even if the peak part 44B of the notch 44 is kept triangular.

Figure 23:
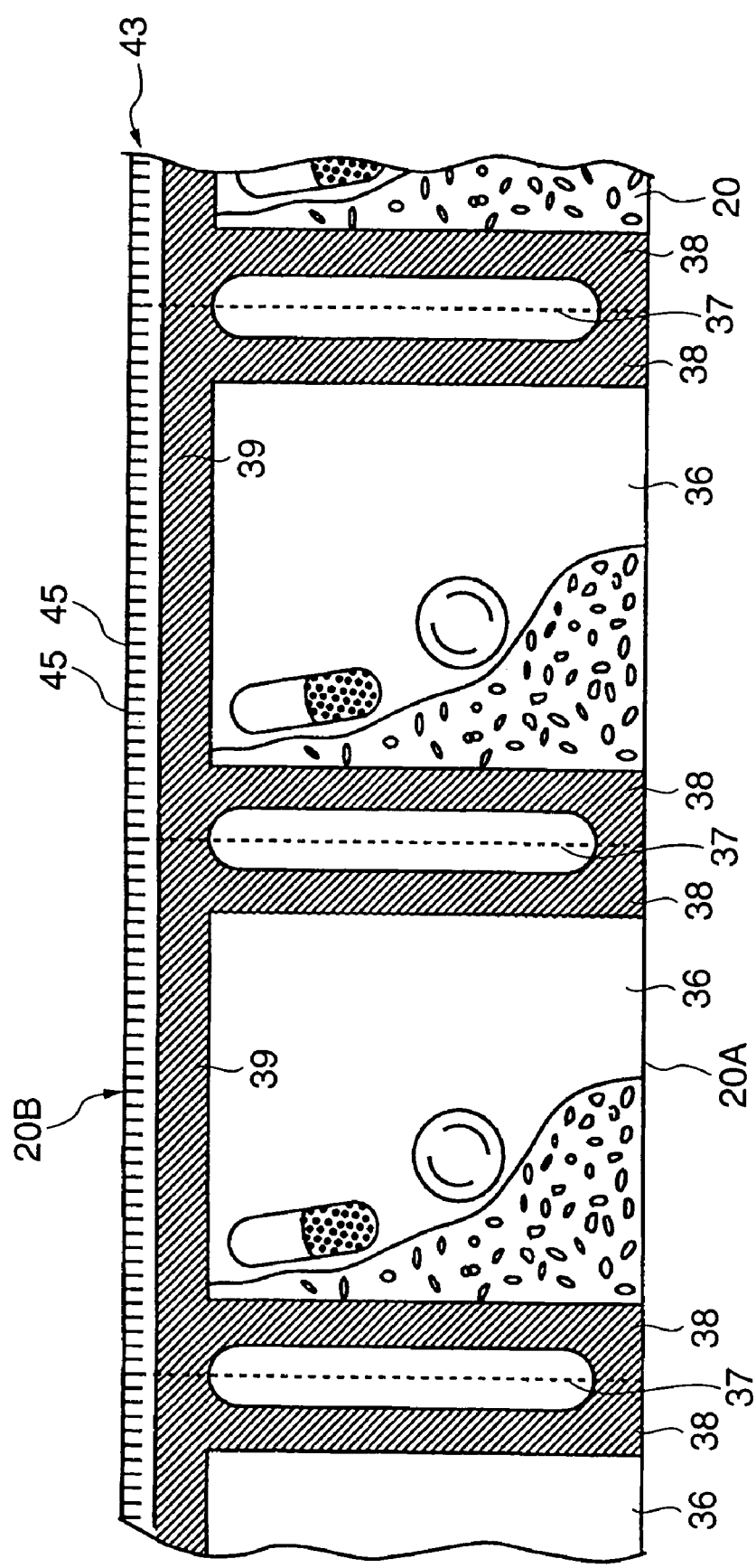
FIG. 23 is a plan view schematically showing a medicine wrapping sheet according to further yet another embodiment of the present invention.

FIG. 23 shows a divided wrapping bag 36 of yet another example. In this case, a plurality of cuts 45 are disposed on an end of the divided wrapping bag 36 in place of the triangular notches 44. The cuts 45 of about 0.5 mm to 1.0 mm are disposed from the opening 20B of the divided wrapping bag 36 toward the folded part 20A. Sizes of the cuts 45 are not limited to such. Smaller sizes may be adopted as long as the divided wrapping bag 36 can be cut and opened from the cuts 45. Since the plurality of cuts 45 are disposed in the divided wrapping bag 36 in place of the triangular notches 44, an aged person or a child, especially even a weakhanded sick person can easily be cut and opened the divided wrapping bag 36.

The embodiments have been described by way of example in which the medicines are solid medicines. However, the present invention applies even if medicines are not solid medicines but granular medicines or powder medicines.

As described above, according to the medicine wrapping machine of the present invention, the medicine wrapping sheet is not inferior at all compared with the case of using the conventional glassine or cellophane paper, e.g., in terms of handleability and easy preparation and monitoring during medicine dividing and wrapping, and it is cut to a desired predetermined width to be wound. Thus, the invention can be applied to the conventional automatic medicine wrapping machine. In other words, it is not necessary to manufacture or buy a new or dedicated automatic medicine wrapping machine.

Since even the aged person or the child can easily be cut and opened the divided wrapping bag with bare hands, the divided and wrapped medicines can be guided not along the fused part but the folded part (nonfused part). Thus, it is possible to obtain highly effective operation effects, e.g., a capability of surely taking all of even fine particles such as powder medicines without leaving any, etc.

According to the medicine wrapping sheet of the present invention, the medicine wrapping sheet is belt-shaped for forming the plurality of divided wrapping bags continuous in the state of containing the medicines therein and separated at the time of taking the medicines, the raw material thereof is the plastic sheet and, in both side ends edge parts, the triangular notches are formed to be superposed on each other when the sheet is folded in two, and these are joined and thermally fused to each other. Thus, when the medicine contained in the divided wrapping bag is taken out, the divided wrapping bag can be cut and opened along the notch of the plastic sheet. Accordingly, for example, even a divided wrapping bag constituted of a plastic sheet difficult to be opened compared with a conventionally used wrapping sheet such as polyethylene laminate cellophane paper or polyethylene laminate glassine paper can be easily cut and opened from a desired notch position. Thus, the aged person or the child, especially even the weakhanded sick person can easily be cut and opened the divided wrapping bag with bare hands.

According to the medicine wrapping sheet of the present invention, in addition to the above, since the notches of both side edge parts roughly match each other when the sheet is folded in two, a cutting force is easily concentrated on the notch parts disposed on both side edge parts of the divided wrapping bag. Accordingly, the divided wrapping bag can be cut and opened from the notch part even by a relatively weak force. Thus, the aged person or the child, especially even the weakhanded sick person can easily be cut and opened the plastic sheet from the notches of both side edge parts of the folded divided wrapping bag.

According to the medicine wrapping sheet of the present invention, in addition to the above, since the notches of both side edge parts deviate from each other when the sheet is folded in two, when the divided wrapping bag is cut and opened from the notch parts disposed on both side edge parts of the medicine wrapping sheet, cut ends of the divided wrapping bag can deviate. Accordingly, the divided wrapping bag can be easily opened from the cut and deviated ends of the divided wrapping bag. Thus, it is possible to take out the medicine from the divided wrapping bag very easily.

According to the medicine wrapping sheet of the present invention, in addition to the above, since the angle formed between the opposing oblique sides of the triangle notch is set to 110° or less, in the medicine wrapping process by the medicine wrapping machine, tearing-off of the plastic sheet from the notch is difficult when the plastic sheet is pulled and, for example, it never happens that the angle of the triangular notch becomes excessively large to cause a difficulty of concentration of a force to be cut and opened the divided wrapping bag for the patient when the divided wrapping bag is cut and opened. Thus, it is possible to provide a triangular shape notch which can be suitably used for wrapping the medicine by the medicine wrapping machine and which enables easy cutting-open of the divided wrapping bag by the patient.

According to the medicine wrapping sheet of the present invention, in addition to the above, since the bottom part of the triangular notch is formed in a curved shape having a radius of 2 μm to 10 μm, protrusion of the cut from the bottom part is prevented when the notch is formed. Thus, it is possible to prevent inconveniences such as scattering of the medicine from the divided wrapping bag caused by tearing-off of the divided wrapping bag in an unintended direction.

According to the medicine wrapping machine of the present invention, since the medicines are wrapped by using the belt-shaped medicine wrapping sheet of one of the aforementioned inventions, and forming the plurality of divided wrapping bags continuous in the state of containing the medicines therein and separated at the time of taking the medicines, notches can be formed in both side edge parts at the plastic sheet stage. Accordingly, notches can be easily formed in all the continuous divided wrapping bags. Thus, it is possible to remarkably reduce costs of the divided wrapping bags which contain the medicines.

According to the divided wrapping bag of the present invention, the divided wrapping bags are formed by joining and thermally fusing the side edge parts of the belt-shaped medicine wrapping sheet of one of the aforementioned inventions to each other, and thermally fusing them in the belt shape of the predetermined width in an orthogonal direction to the longitudinal direction of the medicine wrapping sheet. The divided wrapping bags are adapted to be continuous in the state of containing medicines therein and separated at the time of taking the medicines, and the portions in which the notches are formed are not thermally fused. Accordingly, leakage of the raw material of the medicine wrapping sheet melted from the notch part of the triangular shape can be prevented. Thus, it is possible to prevent inconveniences such as sticking of the leaked raw material of the medicine wrapping sheet to the medicine wrapping machine or appearance deterioration of the divided wrapping bag.

According to the divided wrapping bag of the present invention, in addition to the above, since the joined and thermally fused position is apart from the bottom part of each of the notches by 0.5 mm to 1.0 mm, for example, leakage of the melted raw material of the medicine wrapping sheet to the notch end of the triangular shape can be effectively prevented. Accordingly, it is possible to prevent inconveniences such as sticking of the side edge part of the medicine wrapping sheet to the medicine wrapping machine. Thus, it is possible to prevent a reduction in operational performance of the medicine wrapping machine.

According to the medicine wrapping machine of the present invention, since the medicine wrapping machine wraps the medicines by forming the divided wrapping bags described in the aforementioned inventions, performance of the medicine wrapping machine can be remarkably improved. Thus, it is possible to remarkably increase convenience of the medicine wrapping machine.

What is claimed is:

1. A medicine wrapping machine for wrapping a medicine in a belt-shaped transparent composite plastic sheet which includes one of a polyethylene terephthalate sheet and a bi-axially oriented polypropylene sheet and having a minute flaw formed on said one of the polyethylene terephthalate sheet and the bi-axially oriented polypropylene sheet, and each of side edge parts of said composite sheet is of wavy or saw-tooth shape;

said machine including an apparatus for forming from said belt-shaped sheet a plurality of individual wrapping bags each to receive a medicine, with the wavy or saw-tooth shape side edge parts of the belt-shaped medicine wrapping sheet are forming triangular notches when the sheet is folded and the side edge parts are overlapped and are joined and thermally fused to each other along the length of the belt-shaped wrapping sheet except in the area of the triangular notches, thermally fused areas along the length of the sheet in an orthogonal direction to a longitudinal direction of the wrapping sheet to form individual wrapping bags of a predetermined width, each bag to receive the medicine therein; and lines of perforations across said belt-shaped sheet along its length to permit separation of the individual wrapping bags.

2. A medicine wrapping machine according to claim 1 wherein a polyethylene sheet of the composite plastic sheet is an inner sheet of the wrapping bag.

3. The medicine wrapping machine according to claim 1, wherein said apparatus operates to place the notches of both the side edge parts to roughly match each other when the sheet is folded in two.

4. The medicine wrapping machine according to claim 1, wherein said apparatus operates to place the notches of both the side edge parts to deviate from each other when the sheet is folded in two.

5. The medicine wrapping machine according to claim 1 wherein said apparatus operates to form a non-fused pocket in the fused area between two wrapping bags across the width of the belt-shaped wrapping sheet.

6. The medicine wrapping machine according to claim 1 wherein a line of perforations start at the apex of a triangular notch and extend substantially across the sheet in the orthogonal direction.

7. The medicine wrapping machine according to claim 1 wherein said line of perforations is in the fused areas that form the individual wrapping bags.

8. The medicine wrapping machine according to claim 7 wherein a line of perforations start at the apex of a triangular notch which is above a said fused area.

9. A medicine wrapping machine for wrapping a medicine in a belt-shaped transparent composite plastic sheet which includes one of a polyethylene terephthalate sheet and a bi-axially oriented polypropylene sheet with both side edge parts of the composite sheet being formed in a wavy or saw-toothed shape to overlap each other when the sheet is folded in two, and the side edge parts are joined and thermally fused to each other;

said machine including an apparatus for forming from said sheet a plurality of individual wrapping bags each to receive a medicine, with the wavy or saw-toothed shape side edge parts of the belt-shaped medicine wrapping sheet are forming triangular notches when the sheet is folded and the side edge parts are overlapped and are joined and thermally fused to each other along the length of the belt-shaped sheet except in the area of the triangular notches, thermally fused in an area spaced apart by a predetermined width in an orthogonal direction to a longitudinal direction of the medicine wrapping sheet to form the individual wrapping bags, each to receive the medicine therein, and having lines of perforations across said belt-shaped sheet along its length to permit separation of the individual bags.

10. The medicine wrapping machine according to claim 9, wherein said belt-shaped sheet further includes a minute flaw formed on one of the polyethylene terephthalate sheet or the biaxially oriented polypropylene sheet.

* * * * *

UNITED STATES PATENT AND TRADEMARK OFFICE
CERTIFICATE OF CORRECTION

PATENT NO. : 7,493,744 B2
APPLICATION NO. : 10/735181
DATED : February 24, 2009
INVENTOR(S) : Yasutoshi Nishimura It is certified that error appears in the above-identified patent and that said Letters Patent is hereby corrected as shown below:

Title Page item 73 should read

Assignees: Sanyo Electric Co., Ltd., Osaka, Japan
                  Sanyo Electric Biomedical Co., Ltd., Gifu, Japan
                  Nishimura Chemical Co., Ltd., Gifu, Japan

Signed and Sealed this

Sixteenth Day of June, 2009

JOHN DOLL
*Acting Director of the United States Patent and Trademark Office*